(12) United States Patent
Giovanneschi et al.

(10) Patent No.: US 11,919,271 B2
(45) Date of Patent: Mar. 5, 2024

(54) PRODUCTION LINE FOR MAKING A COVERED BOX

(71) Applicant: EMMECI S.P.A., Cerreto Guidi (IT)

(72) Inventors: Alessio Giovanneschi, Montopoli In Val D'Arno (IT); Pablo Baroni, Vicopisano (IT)

(73) Assignee: EMMECI S.P.A., Cerreto Guidi (IT)

( * ) Notice: Subject to any disclaimer, the term of this patent is extended or adjusted under 35 U.S.C. 154(b) by 0 days.

(21) Appl. No.: 17/778,173

(22) PCT Filed: Nov. 19, 2020

(86) PCT No.: PCT/IB2020/060908
§ 371 (c)(1),
(2) Date: May 19, 2022

(87) PCT Pub. No.: WO2021/099984
PCT Pub. Date: May 27, 2021

(65) Prior Publication Data
US 2023/0025640 A1 Jan. 26, 2023

(30) Foreign Application Priority Data
Nov. 22, 2019 (IT) .................. 102019000021924

(51) Int. Cl.
*B31B 50/26* (2017.01)
*B31B 50/04* (2017.01)
(Continued)

(52) U.S. Cl.
CPC .......... *B31B 50/262* (2017.08); *B31B 50/042* (2017.08); *B31B 50/46* (2017.08);
(Continued)

(58) Field of Classification Search
CPC .. B31B 1/72; B31B 3/00; B31B 50/00; B31B 50/44; B31B 50/26; B31B 50/262;
(Continued)

(56) References Cited

U.S. PATENT DOCUMENTS 6,267,715 B1 * 7/2001 Sass .................. B31B 50/00
493/131
2012/0115698 A1 * 5/2012 Vizanova Alzamora ....................
B31B 50/26
493/126

(Continued)

FOREIGN PATENT DOCUMENTS

EP 2991821 B1 * 9/2016 ............. B31B 50/00
EP 2991821 B1 * 9/2016 ............. B31B 50/00
(Continued)

*Primary Examiner* — Jacob A Smith
(74) *Attorney, Agent, or Firm* — Pearne & Gordon LLP; Bryan M. Gallo

(57) ABSTRACT

A production line (1) for making a covered box (8) comprises: a forming machine (2), configured to receive a cardboard box blank (6) and to fold it to form the box and including a plurality of folders (21) and a movement system configured to receive the box blank (6) oriented horizontally, and comprising a plurality of columns (23), extending along the vertical direction (V) and configured to abut against the base (6a) of the box blank (6) and to move it along a vertical direction (V); a gluing unit (3), configured to receive a covering blank (7) and to spread glue on the covering blank (7); a positioning device (4), configured to position the box on the covering blank (7); a covering machine (5), configured receive the box coupled to the respective covering blank (7) from the positioning device (4) and to fold the covering blank (7) into contact with the box in such a way as to cover the box.

20 Claims, 10 Drawing Sheets

(51) Int. Cl.
  *B31B 50/46* (2017.01)
  *B31B 50/62* (2017.01)
  *G06T 7/00* (2017.01)
  *B31B 100/00* (2017.01)
  *B31B 105/00* (2017.01)
  *B31B 120/50* (2017.01)
(52) U.S. Cl.
  CPC ............ *B31B 50/624* (2017.08); *G06T 7/001* (2013.01); *B31B 2100/0024* (2017.08); *B31B 2105/0024* (2017.08); *B31B 2120/50* (2017.08)
(58) Field of Classification Search
  CPC ..... B31B 50/624; B31B 50/46; B31B 50/042; B31B 2105/0024; B31B 2100/0024
  USPC ......................................................... 193/128
  See application file for complete search history.

(56) References Cited

U.S. PATENT DOCUMENTS

| | | | |
|---|---|---|---|
| 2013/0108408 A1* | 5/2013 | Saison ................. | B65H 3/0816 414/797 |
| 2016/0067936 A1 | 3/2016 | Mazzinghi et al. | |
| 2019/0143627 A1 | 5/2019 | Giovanneschi et al. | |

FOREIGN PATENT DOCUMENTS

| | | | | |
|---|---|---|---|---|
| EP | 2991821 | B1 | 9/2016 | |
| EP | 2486079 | A1 * | 5/2019 | ........... B31B 50/005 |
| EP | 3486079 | A1 * | 5/2019 | ........... B31B 50/005 |
| EP | 3486079 | A1 | 5/2019 | |
| IT | 0001422093 | | 5/2016 | |
| IT | 0001422094 | | 5/2016 | |

\* cited by examiner

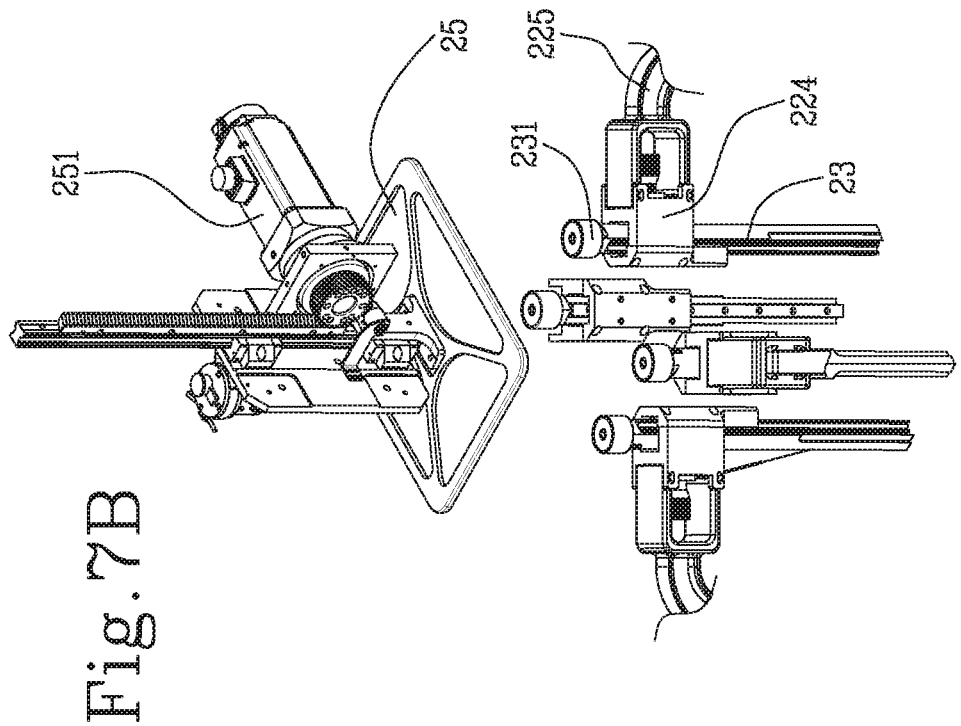
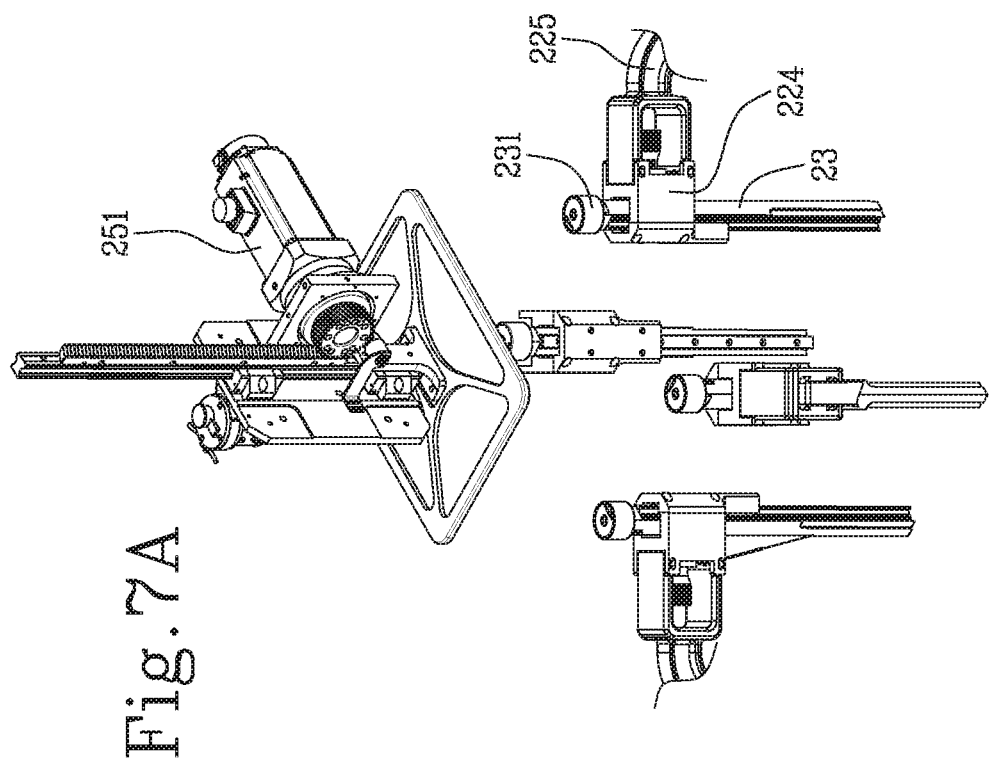

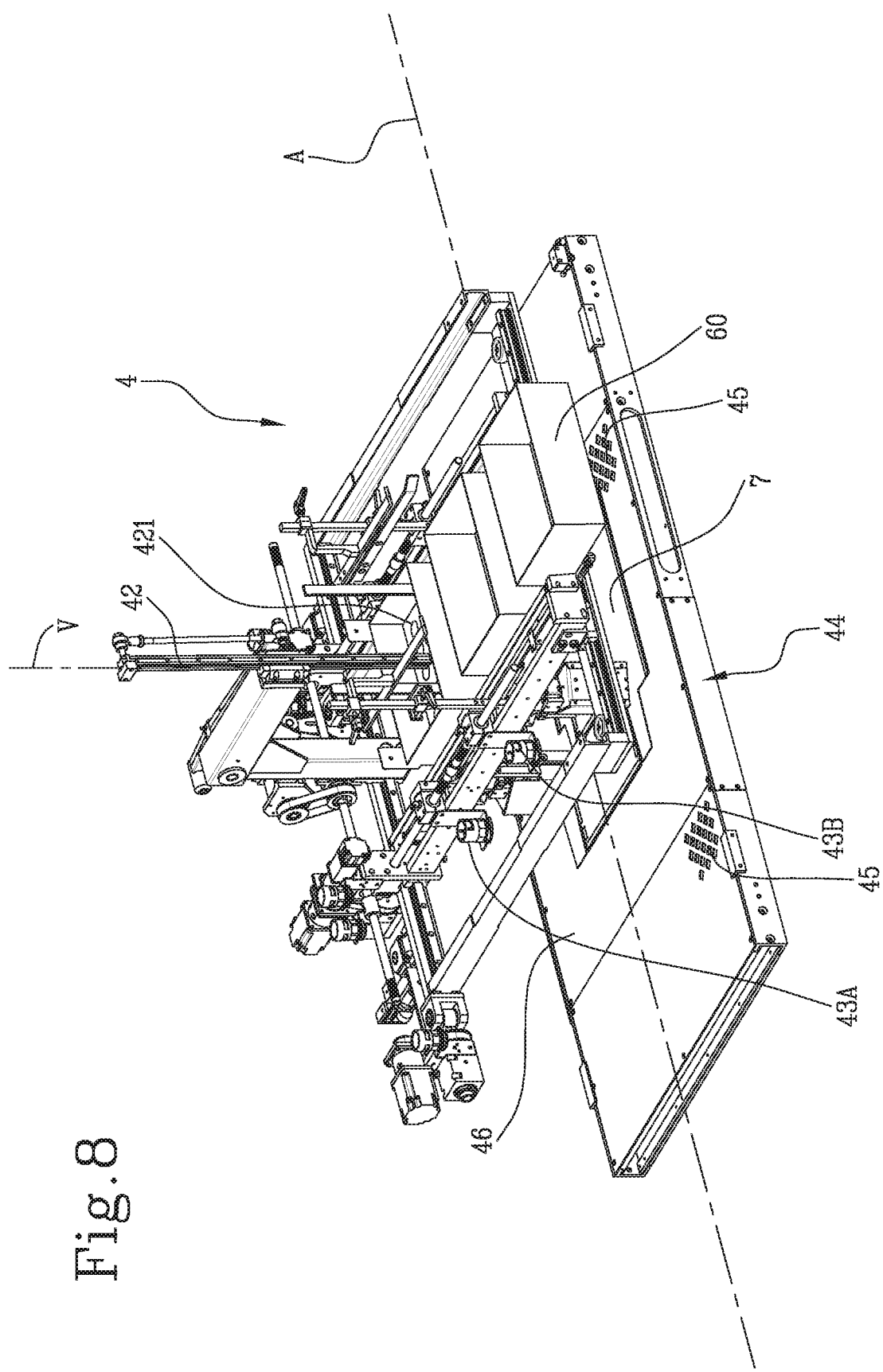

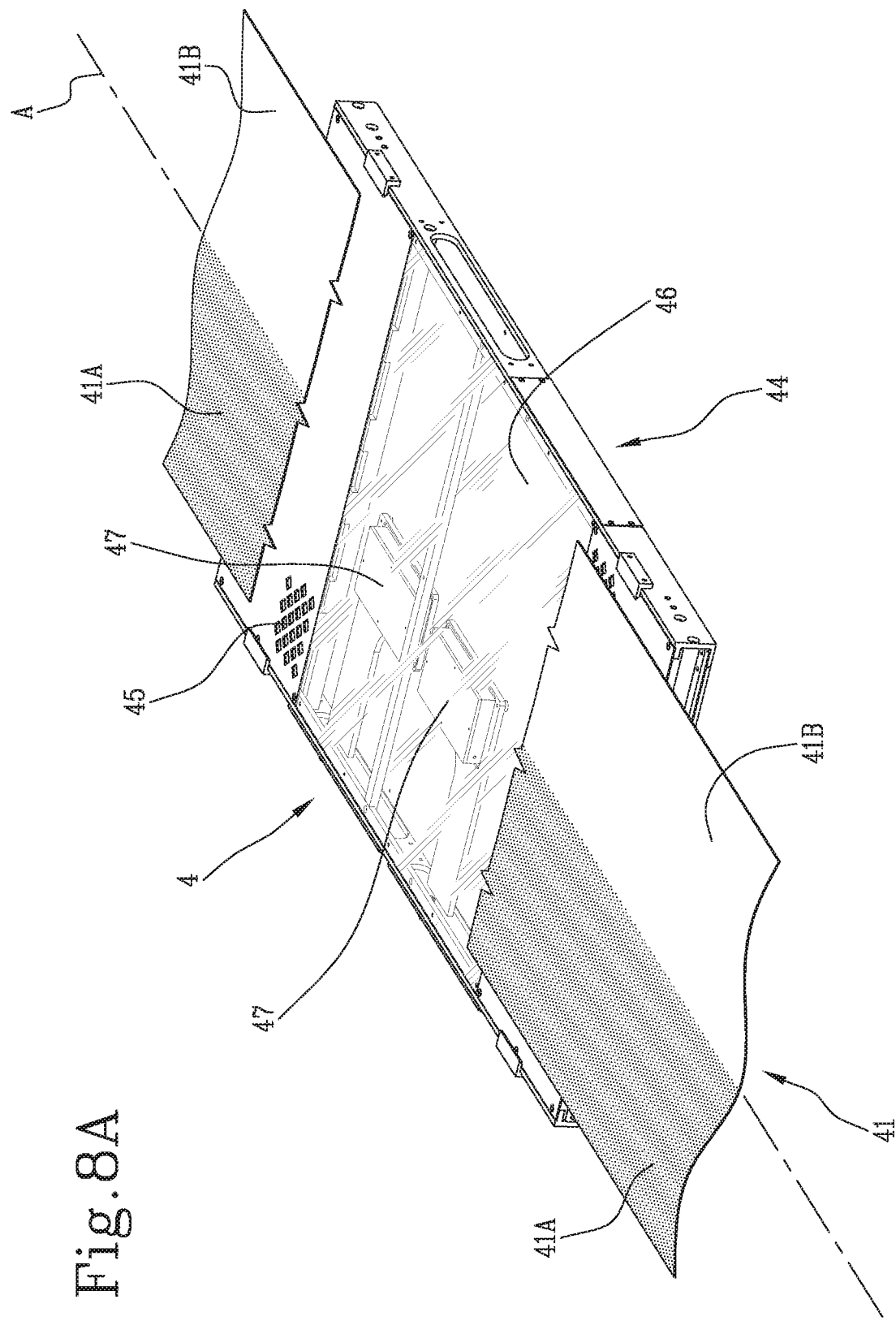

PRODUCTION LINE FOR MAKING A COVERED BOX

TECHNICAL FIELD

This invention relates to a forming machine for forming a box and to a method for forming a box. This invention also relates to a production line for making a covered box and to a method for making a covered box.

BACKGROUND ART

In the field of box making, forming machines or quadrangular machines are known, for example from patent document EP2991821B1 in the name of this Applicant, which are configured to form boxes from blank sheets of paper or cardboard; these machines comprise a die which operates on the base of the blank and which is movable along a vertical direction, folding elements configured to interact with segments of the blank to fold and dispose them vertically with their lateral peripheries juxtaposed to define vertical edges of the box, a plurality of feeders configured to unroll heat seal tapes and to dispose pieces of the tapes vertically, facing the vertical edges, and a plurality of sealing heads equipped with corresponding heatable pressers movable towards and away from the box to press the pieces of heat sealing tape against the respective edges, and with corresponding blades for cutting the heat sealing tapes. The size of the vertically movable die must correspond to the size of the box to be formed because it has to abut precisely against the pressers in order to give the box the correct shape. Thus, every time the size of the boxes to be made changes, an operator has to change the die used to form the boxes. This takes time and, what is more, makes it necessary to have as many different dies as there are box sizes to be made, with all the stock management problems that this inevitably involves.

In prior art production lines such as the one described in patent document EP3486079 A1 in the name of this Applicant, the boxes formed by the forming machine are then fed to a positioning device in which they are coupled to a pre-glued covering blank. Lastly, the box, coupled to the covering blank, is fed to a covering machine in which the covering blank is folded into contact with the respective box in such a way as to cover the box. In this context, improving the positioning precision of the box on the covering blank, in the positioning device, is a widely felt need in this field. There is also a widely felt need to ensure correct folding of the fold-over flaps and wings of the covering blank in the covering machine, even where the fold-over flaps are not covered with glue.

Patent document US2012/115698A1 concerns a quadrangular machine for forming boxes of different sizes; this document provides that the boxes are sealed by glue guns.

DISCLOSURE OF THE INVENTION

This disclosure has for an aim to provide a forming machine for forming a box and a method for forming a box to overcome the above mentioned disadvantages of the prior art. This disclosure also has for an aim to provide a production line for making a covered box and a method for making a covered box to overcome the above mentioned disadvantages of the prior art.

The aim is fully achieved, according this disclosure, by the forming machine and method for forming a box as characterized in the appended claims. The aim is fully achieved, according this disclosure, by the production line for making a covered box and by the method for making a covered box as characterized in the appended claims.

More specifically, this disclosure relates to a forming machine or (quadrangular machine) for forming a box from a (box) blank of paper or cardboard. The (box) blank includes a base, configured to define a base wall of the box and side panels, connected to the base and foldable to define a side wall of the box.

The forming machine comprises a working zone, configured to receive the blank. The forming machine comprises a plurality of folders positioned in the working zone and configured to interact with the side panels of the blank to fold them and dispose them parallel to a vertical direction, with respective lateral peripheries juxtaposed to define vertical edges of the side wall of the box, so that the side panels of the blank delimit an internal space inside the box.

Preferably, the forming machine comprises a plurality of heads. Preferably, the heads are movable towards and away from each other (at least to perform changeover, that is to say, to adapt themselves to forming boxes of different sizes). Each head of the plurality of heads includes a presser, configured to abut against a corresponding vertical edge from the outside of the space inside the box.

In an embodiment, the heads are configured to seal the vertical edges of the box by applying a tape of sealing (or heat sealing) material. In this embodiment, each head may include a feeder, configured to place a piece of sealing (or heat sealing) tape so it faces a respective vertical edge; in particular, the feeder is configured to unroll the tape; it should be noted that, in another embodiment, the machine might be provided with a feeder that is disconnected from the head. In this embodiment, each head also includes a cutter to cut the sealing tape in order to isolate the piece from it. Preferably, in this embodiment, the presser is movable in a horizontal plane relative to the head in order to press the heat sealing tape on the vertical edge. More specifically, the presser has a fixed horizontal stroke to move between a withdrawn position (where it does not interfere with the vertical edge) and an advanced position (where it presses the heat sealing tape on the vertical edge).

In another embodiment, glue is spread on the connecting lines between the base and the side panels; that way, when the side panels are folded, they are kept in the vertical position by the glue (without having to use sealing tape). In this embodiment, too, it is useful to have pressers that abut against the vertical edges from the outside while the box is being formed.

Preferably, the forming machine also comprises a plurality of columns, extending along the vertical direction. The columns are movable along the vertical direction. Each column of the plurality of columns can be placed in the internal space inside the box, at a position in front of a respective presser. That way, each column abuts against a respective vertical edge of the box, operatively interposed between the column and the presser. Thus, the columns substitute the die of traditional forming machines.

Preferably, the columns are movable in the horizontal plane towards and away from each other (preferably in coordinated and/or synchronized manner); that way, they can be adapted to boxes of various different sizes (in practice, constituting a variable size die). More specifically, the movable columns are configured to abut against the base of the box blank received in the forming machine, where the columns of the plurality of columns are movable along the vertical direction to push the box blank in the vertical direction.

Preferably, each column of the plurality of columns is associated with a respective head of the plurality of heads. In particular, each column of said plurality of columns is supported by (or mounted on, or coupled to) a respective head of the plurality of heads. Preferably, each column is slidably coupled to the head so as to move in the vertical direction relative to the head.

Preferably, each head of the plurality of heads is movable in a horizontal plane, perpendicular to the vertical direction, between a withdrawn position, where it does not interfere with the box positioned in the working zone, and an advanced position, where it operates on a respective vertical edge of the box. Preferably, the heads are movable in a coordinated and/or synchronized manner. Thus, each head of the plurality of heads is configured to move the column associated with it in the horizontal plane.

More specifically, each head of the plurality of heads includes a vertically oriented guide; each column of the plurality of columns is slidably coupled to the guide of the respective head. It should be noted that for each head of the plurality of heads, the guide is positioned at a different vertical height relative to the corresponding presser; that way, the guide does not interfere with the presser; preferably, the guide is positioned at a greater vertical height than the corresponding presser. The blank is fed in a space between the guide and the presser.

Preferably, the forming machine comprises a plate that is movable along the vertical direction. The plate is preferably located above (or below) the guides. The columns of the plurality of columns are removably connectable (or connected) to the plate. Thus, the machine has (that is, is operable in) a working configuration, in which the columns are connected to the plate to move vertically therewith and a changeover configuration, in which the columns are disconnected (hence detached) from the plate and are movable horizontally (preferably as one with the heads).

Preferably, the columns are connectable magnetically to the plate. More specifically, the plate includes a ferromagnetic material and each column of the plurality of columns includes, at an upper (or lower) end of it, a magnet that can be magnetically coupled to the plate. Thus, the magnets of the columns of the plurality of columns are configured to exert an attractive force on the plate.

The forming machine also comprises an actuator for the plate, configured to move the plate along the vertical direction. In the working configuration, the columns are movable along the vertical direction by effect of the movement of the plate.

The machine may also comprise an electric circuit including, for each column, an electrical winding that is traversable by an energizing current to generate a magnetic force able to oppose and cancel a magnetic force inherent in the respective magnet. Thus, in the absence of energizing current, the magnets exert an attractive force which keeps the columns attached to the plate (the machine is in the working configuration) and, in the presence of energizing current, the attractive force of the magnets is canceled and the columns are detached from the plate (the machine is in the changeover configuration). This configuration allows reduced consumption of electrical energy: in effect, during machine operation, the electrical circuit remains off and is switched on only when the columns need to be disconnected to perform a changeover.

It should be noted that for each head of the plurality of heads, the corresponding guide is located at a predetermined distance from the respective cutter, relative to a horizontal direction of movement of the cutter, at an advanced position towards the corresponding guides of the other heads of the plurality of heads. In effect, the column (associated with the head) must abut against an inside surface of the vertical edge of the box, while the sealing tape is applied on an outside surface of the vertical edge of the box (and the cutter operates on the sealing tape). Since the box has a non-zero thickness, the column is placed at an advanced position relative to the cutter (and the presser). Preferably, for each head of the plurality of heads, the machine comprises an adjustment device for varying the predetermined distance between the guide and the corresponding cutter (and/or the corresponding presser, at the respective advanced position). That way, the relative position of the columns with respect to the cutters and/or the pressers and/or the feeders can be modified as a function of the thickness of the box blank. More specifically, the head is positioned in such a way that the columns adhere to the vertical edges inside the internal space of the box and the position of the pressers and/or the cutters and/or the feeders is adjusted relative to the column guides as a function of the thickness of the paper. The adjustment device itself may form part of the head. In an embodiment, the adjustment device can be operated manually (using a knob, for example). In an embodiment, the adjustment device includes a controlled actuator.

The forming machine comprises a pair of crossbars, oriented in a longitudinal direction parallel to the horizontal plane, and a pair of crossbar guides, oriented in a transverse direction perpendicular to the longitudinal direction and parallel to the horizontal plane. The heads of the plurality of heads are associated with the pair of longitudinal crossbars to move along the longitudinal crossbars; the longitudinal crossbars are, in turn, movable along the respective guides in the transverse direction (to perform changeover).

This disclosure also relates to a forming method for forming a box from a (box) blank of paper or cardboard. The (box) blank includes a base, configured to define a base wall of the box and side panels, connected to the base and foldable to define a side wall of the box.

It is here observed that the method for forming a box is carried out through a forming machine. In this light, the present disclosure also provides a method for using a forming machine and/or a method for building a forming machine. In particular, the method for forming a box may comprise steps concerning the building of a forming machine and/or the use of a forming machine.

The method for forming a box comprises a step of positioning the (box) blank in a working zone. The method for forming a box comprises a step of folding the side panels of the (box) blank to dispose them parallel to a vertical direction, with respective lateral peripheries juxtaposed to define vertical edges of the side wall of the box, so that the side panels of the blank delimit an internal space inside the box.

The method for forming a box comprises a step of sealing the vertical edges. The step of sealing is carried out by a plurality of pressers and also, preferably, by a corresponding plurality of cutters and a corresponding plurality of feeders.

Preferably, the step of sealing includes, for each vertical edge, a step of feeding a piece of sealing tape so it faces the vertical edge, by means of a feeder (forming part of a head). Preferably, the step of sealing includes, for each vertical edge, a step of applying the piece of sealing tape to the vertical edge on the outside of the internal space of the box, by means of a presser (forming part of a head) which is disposed on the outside of the internal space of the box and which moves towards the vertical edge. Preferably, the step of sealing includes, for each vertical edge, a step of cutting the sealing tape in order to isolate the piece, using a cutter (forming part of the head).

The method for forming a box comprises a step of preparing a plurality of columns. The method for forming a box comprises a step of moving the columns in the vertical direction so that during the step of sealing, each vertical edge is operatively interposed between the respective presser and a respective column of the plurality of columns.

The method for forming a box comprises a step of changeover including a step of moving the columns towards and away from each other in a horizontal plane perpendicular to the vertical direction. Preferably the columns move in a coordinated (or synchronized) manner.

The step of folding may include moving the (box) blank along the vertical direction. Preferably, the step of moving the (box) blank is carried out by means of the columns of the plurality of columns, which abut against the base of the blank and move along the vertical direction, pushing the blank along the vertical direction with them. During the movement of the blank, the side panels interact with a plurality of folders positioned in the working zone on the outer side relative the plurality of columns (so as to be folded vertically).

It should be noted that, during the step of folding, the columns of the plurality of columns are integral with a plate (oriented horizontally) and move along the vertical direction by effect of the lifting and/or lowering of the plate. During the step of folding, the plate inhibits movement of the columns of the plurality of columns in the horizontal plane. During changeover, on the other hand, the columns of the plurality of columns are detached from the plate. During changeover, the columns move in the horizontal plane (thus varying the distance between them). Preferably, the columns are associated with the heads (which also mount the pressers and the cutters) and, during changeover, move in the horizontal plane by effect of the movement of the heads.

Thus, in the step of folding, the columns are attached to the plate to move along the vertical direction and, in the changeover configuration, the columns are attached to the heads to move in the horizontal plane.

According to an aspect of this disclosure, the forming machine comprises a movement system configured to receive the box blank oriented horizontally and to move it along a vertical direction; the folders are configured to interact with the side panels to fold them vertically as the box blank moves along the vertical direction. The movement system of the forming machine comprises the plurality of columns; thus, the plurality of columns is configured to move the (box) blank in the vertical direction. More specifically, the columns are configured to abut against the base of the (box) blank received in the forming machine and are movable along the vertical direction to push the box blank in the vertical direction. The folders are configured to interact with the side panels to fold them vertically as the (box) blank moves along the vertical direction.

This disclosure also relates to a production line to make a covered cardboard box (or covered cardboard boxes). The production line comprises a forming machine according to any of the aspects of this disclosure.

The production line comprises a gluing unit (which may itself be an object of this disclosure), configured to receive a covering blank (of paper) and to spread glue on the covering blank.

The covering blank includes a base, a plurality of panels connected to the base and a plurality of fold-over flaps connected to the panels. It should be noted that the covering blank preferably has a grammage greater than or equal to 250 g/m$^2$. Still more preferably, the grammage of the covering blank is greater than or equal to 275 g/m$^2$ (for example, greater than or equal to 300 g/m$^2$). The thickness of the covering blank is preferably between 1 mm and 2 mm (for example, 1.5 mm). These values of grammage and/or thickness denote a paper covering blank that is sufficiently heavy to cover any flaws in the sealing tape and/or to facilitate embossing.

In one embodiment, the gluing unit includes a roller configured to spread glue evenly on a face of the covering blank which will come into contact with the box.

In an embodiment, the gluing unit is of the type forming part of the apparatus described in Italian patent 0001422093 (application number BO2013A000660) in the name of this Applicant, incorporated herein by reference. It is expressly understood that all the functional and structural features of the apparatus of Italian patent 0001422093 can be applied to the gluing unit of this embodiment.

In particular, the gluing unit may include at least one delivery nozzle configured to deliver hot melt glue (at a high temperature) selectively on portions of the covering blank. The covering blank includes a base and a plurality of side panels connected to the base. The at least one nozzle is configured to deliver glue at a high temperature selectively on portions of the surfaces of the side panels of the plurality of side panels.

The covering blank also includes a plurality of fold-over flaps connected to the longitudinal panels. Preferably, the gluing unit is configured to release the pre-glued covering blank with the fold-over flaps free of glue.

The production line comprises a positioning device (which may itself be an object of this disclosure). The positioning device is configured to receive the box from the forming machine and the covering blank from the gluing unit and to position the box on the covering blank in such a way that the base wall of the box rests on the base of the covering blank.

Preferably, the positioning device includes a belt which is configured to receive the covering blank (from the gluing unit) and to convey it along a feed direction.

The positioning device includes a placing element, movable between a pickup position to receive the box (from the forming machine) and a placing position to place the box at a predetermined position on the covering blank being conveyed by the belt.

The positioning device includes a control unit (it should be noted that the production line preferably comprises a line control unit, so the control unit of the positioning device might be integrated in the line control unit).

The placing element includes a pushing element, operating on the inside surface of the base wall of the box and movable along the vertical direction. The pushing element may include (or consist of) a die, or a plurality of columns (similar to the ones described for the forming machine). The positioning device further comprises one or more strips, operating on the outside surface of the base wall of the box (specifically, at least two strips operating on opposite sides of the outside surface of the base wall); the one or more strips are movable from a closed configuration, where they are oriented horizontally to support the box, to an open configuration, where they are oriented vertically to enable the pushing element to move the box downwards to the placing position on the covering blank. The positioning device further comprises one or more actuators, configured to move the one or more strips from the closed configuration to the open configuration and vice versa. For example, the one or more strips may be driven by mechanical actuators (pistons), hydraulic actuators or pneumatic actuators. Preferably, the control unit synchronously coordinates the opening of the strips and the downward movement of the pusher. This prevents the box from tearing and improves the positioning precision.

Furthermore, one or more of the strips might be movable in the horizontal plane to adapt to the size of the box.

The positioning device includes at least one camera, which is configured to capture an image of the covering blank located on the belt and which is connected to the control unit. The control unit is configured to compare the image captured by the camera with a reference model previously stored; the control unit is also configured to instruct the placing element to modify the placing position of the placing element as a function of the comparison between the image captured by the camera and the reference image. More specifically, if the image captured by the camera differs significantly from the reference model, the control unit instructs the placing element to move in order to modify the placing position of the box on the covering blank and/or to modify the instant at which the placing element places the box on the covering blank. The reference model may be defined by previously stored images.

More specifically, the positioning device includes a first pair of cameras and a second pair of cameras. The cameras of the first pair and of the second pair define the at least one camera. The belt includes at least a first portion having a first colour and a second portion having a second colour, different from the first colour. The belt is configured to convey the covering blank in a feed direction. The first portion and the second portion both extend in the feed direction; the first portion and the second portion are juxtaposed in the feed direction. The first pair of cameras is configured to capture images of portions of the covering blank located on the first portion of the belt; the second pair of cameras is configured to capture images of portions of the covering blank located on the second portion of the belt. The control unit is configured to selectively activate the first pair of cameras or the second pair of cameras to capture respective images; for example, the control unit may selectively activate the first or the second pair of cameras as a function of a selection made by the user and/or as a function of a contrast in the images captured by the cameras. Generally speaking, the pair of cameras used is the pair directed towards the portion of the belt that has more contrast with the covering blank: for example, if the covering blank is light in colour, the control unit activates the cameras directed at the portion of the blank placed on the darker portion; if, on the other hand, the blank is dark in colour, the control unit activates the cameras directed at the portion of the blank placed on the lighter-coloured portion. More specifically, each camera of the first pair and of the second pair is directed at a respective edge of the covering blank. The control unit activates the two cameras of the activated pair one after the other in succession.

The positioning device may include one or more illuminators, configured to light the covering blank positioned on the belt (specifically, the portions of the blank viewed by the cameras). In an embodiment, the positioning device includes an illuminator for each camera and the control unit is configured to selectively activate a pair of cameras and a corresponding pair of illuminators.

The production line (specifically the positioning device) may also include a belt illumination system. More specifically, the zone of the belt that falls within the viewing field of the cameras is lit. Preferably, the belt is back-lit by one or more lighting bodies positioned on the opposite side of the lit stretch of the belt with respect to the cameras (so that stretch of the belt is interposed between the lighting bodies and the cameras). For example, the lighting bodies may be mounted in a frame that supports the belt.

The production line (specifically the positioning device) may also include a screen, connected to the control unit and configured to display the image captured by the at least one camera (specifically, the images captured by the two cameras of the activated pair). That way, the operations carried out by the placing element can be checked on the screen by an operator (or user).

The screen may be a touch screen or it may be connected to a keyboard to allow an operator to change the process parameters and/or to stop and start the production line.

Preferably, the production line includes a line control unit connectable to a remote service system through the Internet. More specifically, the control unit is configured to allow an operator to adjust the lights or cameras and/or to deal with alarms from a remote (and/or a local) workstation.

The line control unit may also be configured to produce a report (for example, for a day's or a week's work) containing one or more of the following information items: size of boxes and/or covering blanks, number of rejected items, alarms triggered, if any. The control unit allows the operator to order spare parts through the Internet. The control unit is also connected to a memory (local or remote) containing one or more of the following information sources: user and maintenance manuals of the machines of the production line; electrical wiring diagrams of the machines of the production line; tutorial videos and/or 3D animations showing how to carry out maintenance or install special kits.

The production line also comprises a covering machine (which may itself be an object of this disclosure). The covering machine is configured receive the box coupled to the respective covering blank from the positioning device and to fold the covering blank into contact with the respective box in such a way as to cover the box.

In an embodiment, the covering machine is of the type described in Italian patent 0001422094 (application number BO2013A000661) in the name of this Applicant, incorporated herein by reference. It is expressly understood that all the functional and structural features of the covering machine of Italian patent 0001422094 can be applied to the covering machine of this embodiment.

More specifically, the covering machine comprises a plate, which is movable along a vertical direction and which is configured to receive the covering blank and the box, with the base of the covering blank coupled to the base wall of the box; the longitudinal side walls of the box received by the plate are oriented along a longitudinal vertical plane, parallel to the vertical direction and to a longitudinal direction, and the transverse side walls are oriented along a transverse vertical plane, parallel to the vertical direction and to a transverse direction.

On an underside face of it, the plate of the covering machine includes a suction pad configured to hold an inside face of the base wall of the box. The covering machine includes a suction unit. The suction pad is connected to the suction unit. The plate also includes a plurality of spacers, fixed to a suction surface of the suction pad, preferably in proximity to the corners of the suction pad; the spacers are configured to abut against the inside face of the base wall of the box. The spacers may be in the form of suction cups.

The covering machine comprises a first folding station, configured to fold longitudinal sides of the covering blank, disposing them in the longitudinal vertical plane, with the longitudinal panels in contact with an outside surface of corresponding longitudinal side walls of the box. The covering machine comprises a second folding station, configured to fold transverse sides of the covering blank, disposing them in the transverse vertical plane, with the transverse panels in contact with an outside surface of corresponding transverse side walls of the box. The covering machine comprises a plurality of intermediate folders, each of which is configured to fold a corresponding fold-over flap, causing it to be folded from the longitudinal vertical plane to the transverse vertical plane and positioned in contact with the transverse side walls of the box.

More specifically, the first and second folding stations each comprise folders for folding the (longitudinal or transverse) panels of the covering blank, disposing them in vertical position with the lower wings in contact with corresponding side walls of the box; the first and second folding stations each also comprise folders for folding the upper wings of the blank towards the inside of the box, from an erect position to a horizontal position; the first and second folding stations each comprise folders for folding the upper wings of the sides of the blank into contact with inside faces of the corresponding side walls of the box. Preferably, the first and second folding stations each comprise pressers which, for each side wall of the box, press towards each other the upper and lower wings of the blank, coupled respectively to the inside and outside face of the side wall itself. The pressers comprise: abutment plates disposed on the outside of the box to prevent the corresponding side walls of the box placed in contact therewith from being pushed outwards; pressing elements movable relative to the corresponding abutment plates by translation along a horizontal direction parallel to the base of the box and insertable into the box to move, when inside the box, towards the corresponding abutment plates and parallel therewith, so as to press the box side walls interposed between the abutment plates and the corresponding pressing elements.

Preferably, the intermediate folders are movable between a withdrawn position, where they are spaced apart from each other, and an advanced position, where they are close together. More specifically, the intermediate folders are movable along respective oblique movement directions, including a vertical component along the vertical direction and a transverse component parallel to the transverse direction, so that, at the withdrawn position, the intermediate folders are at a first vertical height and, at the advanced position, the intermediate folders are at a second vertical height, different from the first vertical height (preferably lower than the first vertical height). In other words, in passing from the withdrawn position to the advanced position, the intermediate folders move downwards towards the box; in passing from the advanced to the withdrawn position, on the other hand, they move upwards. That way, they can remain at the advanced position, in contact with the fold-over flaps of the covering blank for a longer time, until the folders of the second folding station fold the lower transverse panels onto the fold-over flaps. This prevents the folded fold-over flaps from moving away from the box before they are covered by the lower transverse panels. It is noted that this is particularly useful where the fold-over flaps are not pre-glued (for example, where, for added smoothness, the fold-over flaps are not covered with glue to avoid making them too stiff).

The first folding station and the second folding station are located at respective heights, offset along the vertical direction, and wherein the second vertical height of the intermediate folders is interposed between the heights of the first and the second folding station.

This disclosure also relates to a method for making a covered box (or covered boxes). The method for forming a covered box comprises a step of forming a box from a box blank of cardboard. The step of forming is carried out by a forming machine according to one or more aspects of this disclosure. The box blank includes a base, configured to define a base wall of the box and side panels, connected to the base and foldable to define a side wall of the box. Preferably, the step of forming includes moving the box blank along a vertical direction; during this movement, the base of the box blank is oriented horizontally and the side panels interact with folders which cause them to be folded vertically.

The method for making a covered box comprises a step of gluing. The step of gluing includes spreading glue on a covering blank that includes a base, a plurality of panels connected to the base and a plurality of fold-over flaps connected to the panels. The step of gluing is carried out by a gluing unit according to one or more aspects of this disclosure.

The method for making a covered box comprises a step of positioning the box on the covering blank in such a way that the base wall of the box rests on the base of the covering blank. The step of positioning is carried out by a positioning device according to one or more aspects of this disclosure.

The method for making a covered box comprises a step of covering. The step of covering includes folding the covering blank into contact with the box.

Preferably, during the step of forming, the box blank is moved by the plurality of columns which extend along the vertical direction and which move vertically to abut against the base wall of the box blank, so as to push it in the vertical direction.

Preferably, the method for making a covered box comprises a step of size changeover. The step of changeover includes moving the columns in a horizontal plane perpendicular to the vertical direction, towards and away from each other between at least a first configuration for forming boxes of a first size, and a second configuration for forming boxes of a second size, different from the first size.

In at least one embodiment, the step of gluing includes selectively applying glue at a high temperature on portions of the covering blank. The step of forming of the method for making a covered box may also comprise one or more of the aspects described in connection with the method for forming a box.

BRIEF DESCRIPTION OF DRAWINGS

This and other features will become more apparent from the following description of a preferred embodiment, illustrated by way of non-limiting example in the accompanying drawings, in which:

FIGS. 7A and 7B illustrate details of the forming machine of FIG. 4 during size changeover;

FIG. 8 illustrates a positioning device according to this disclosure, with the belt removed;

FIG. 8A illustrates the positioning device of FIG. 8, with the belt partly removed, in a broken view, and with the placing element removed;

DETAILED DESCRIPTION OF PREFERRED EMBODIMENTS OF THE INVENTION

Figure 1:
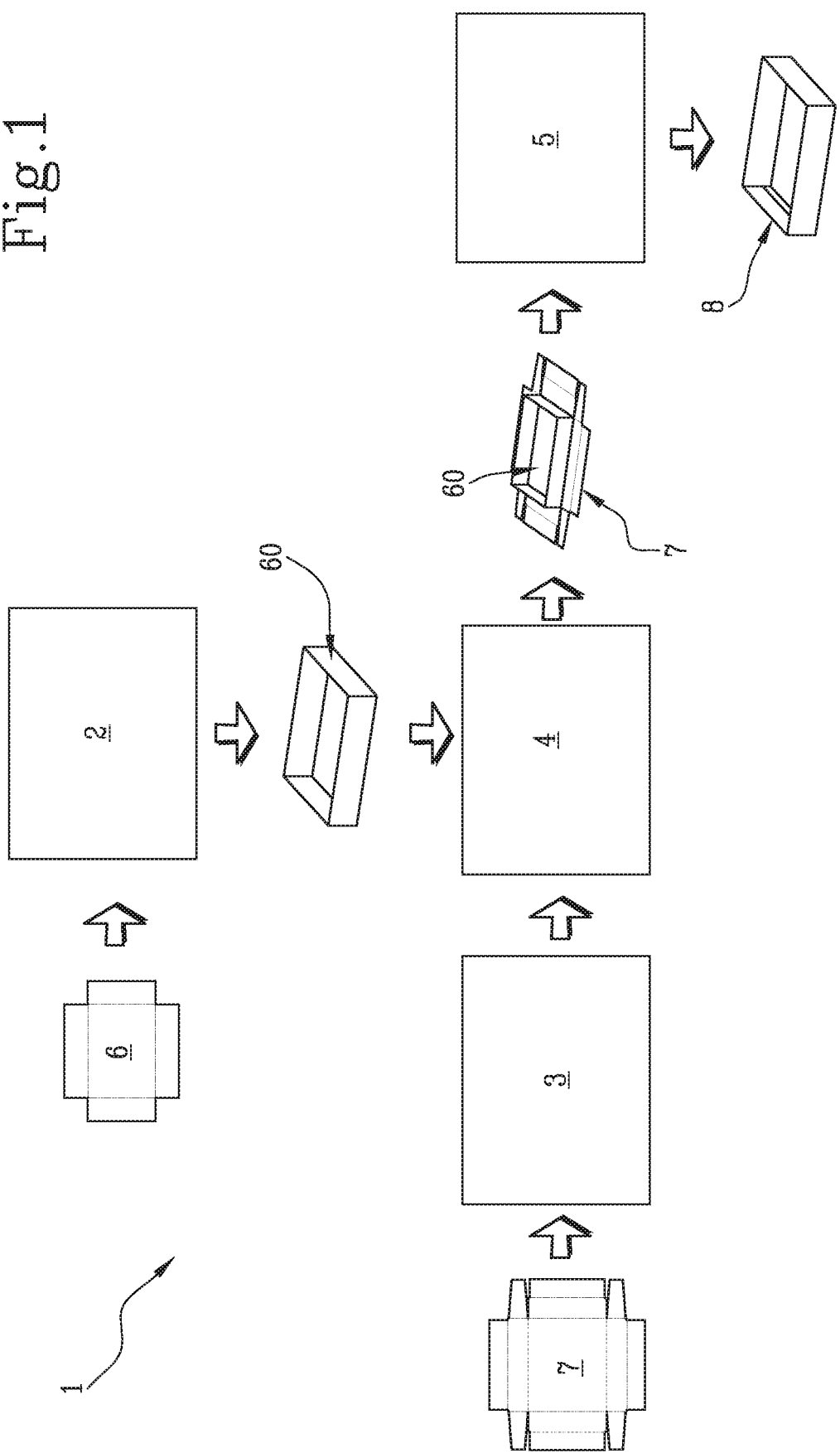
FIG. 1 illustrates a production line for making a covered box according to this disclosure.
Figure 2:
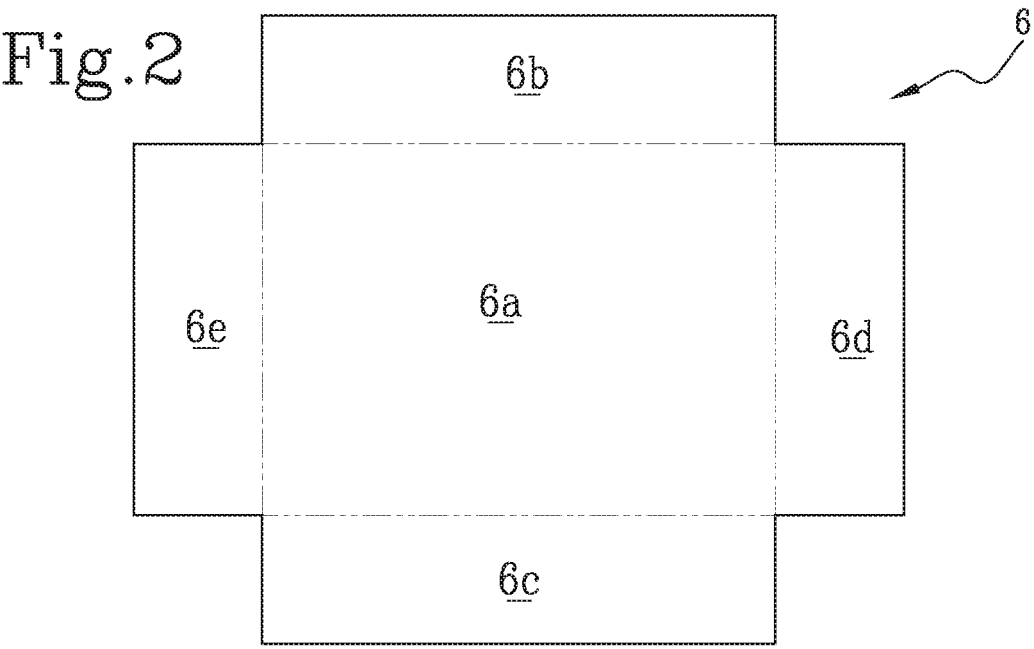
FIG. 2 illustrates a box blank.
Figure 3:
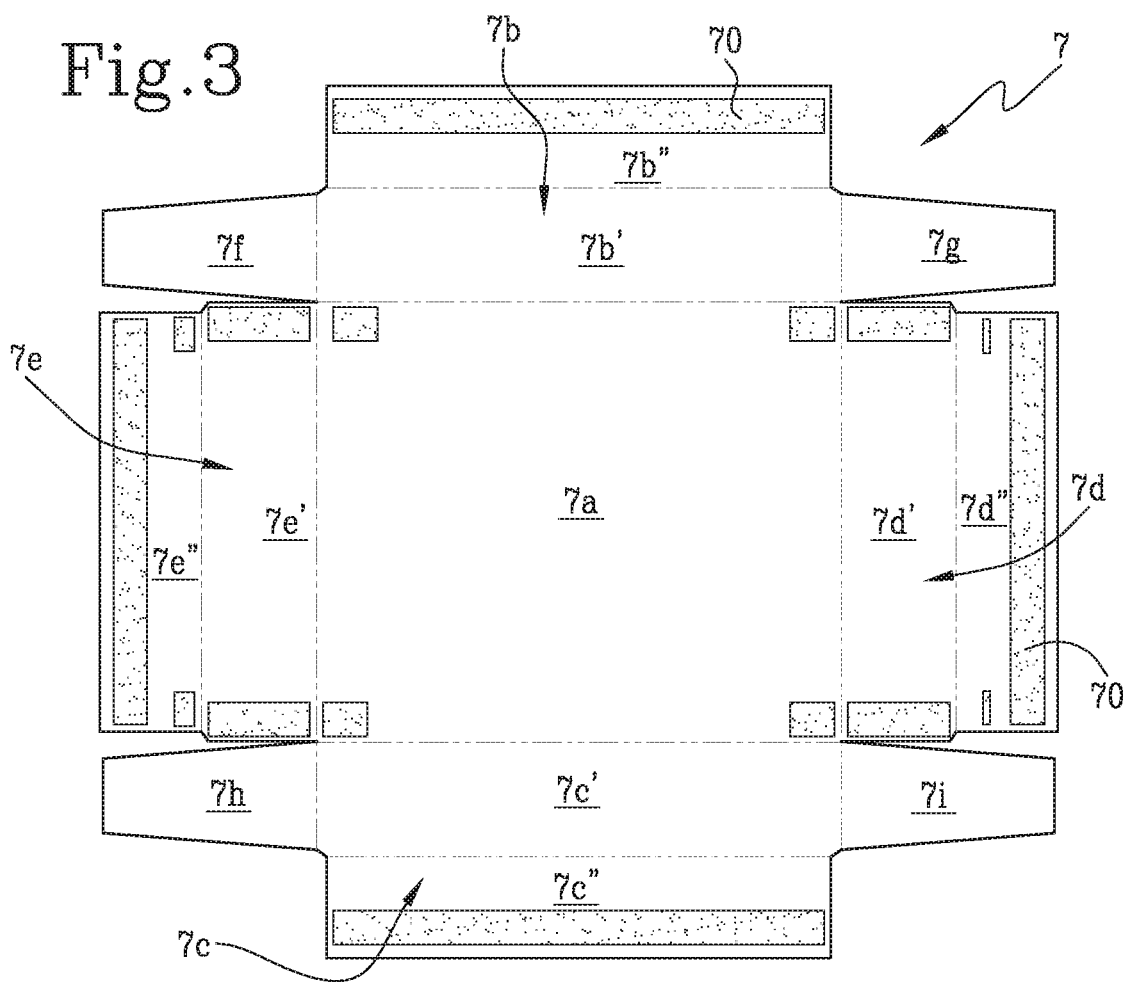
FIG. 3 illustrates a covering blank.
Figure 4:
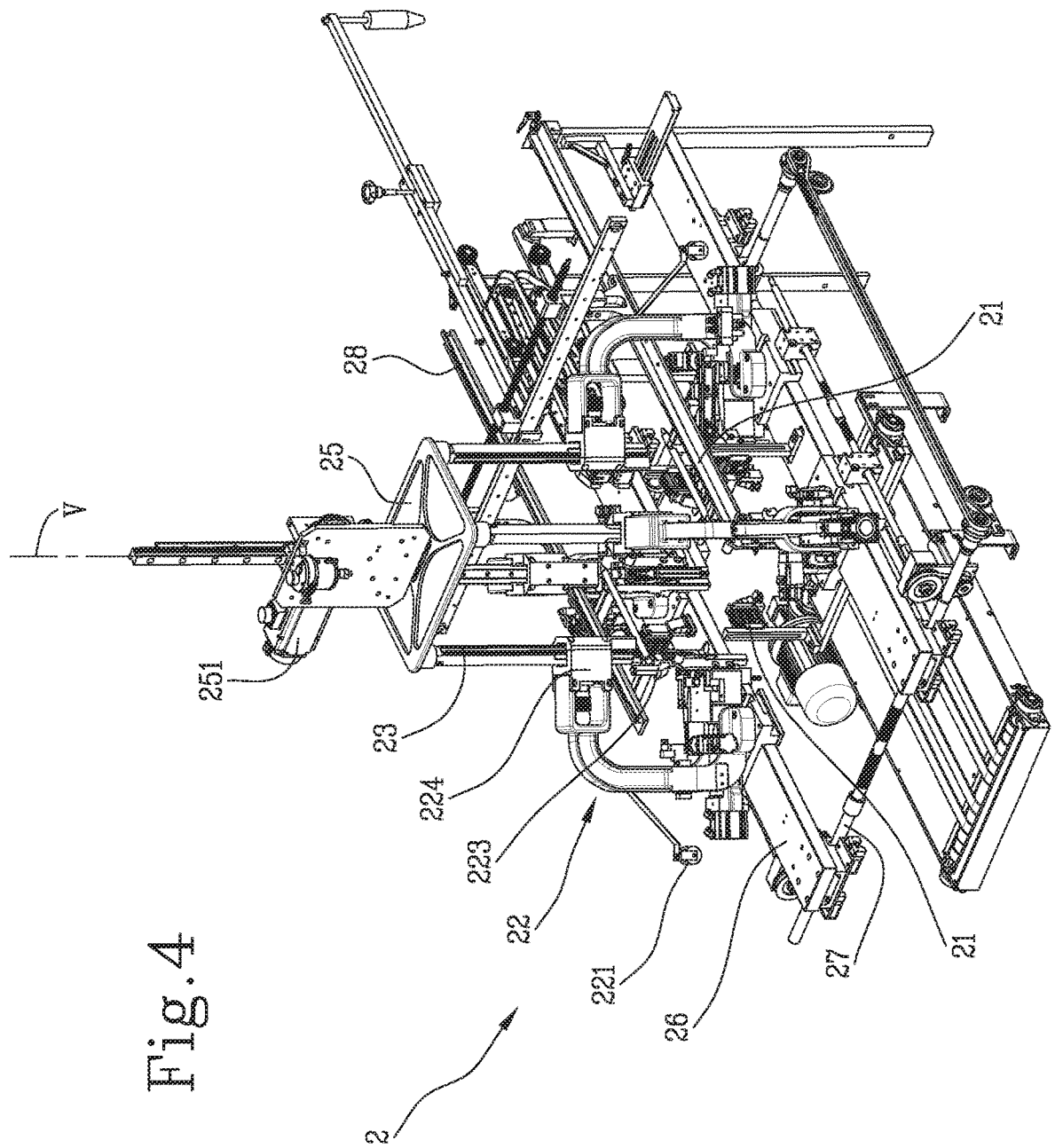
FIG. 4 illustrates a forming machine according to this disclosure.
Figure 5:
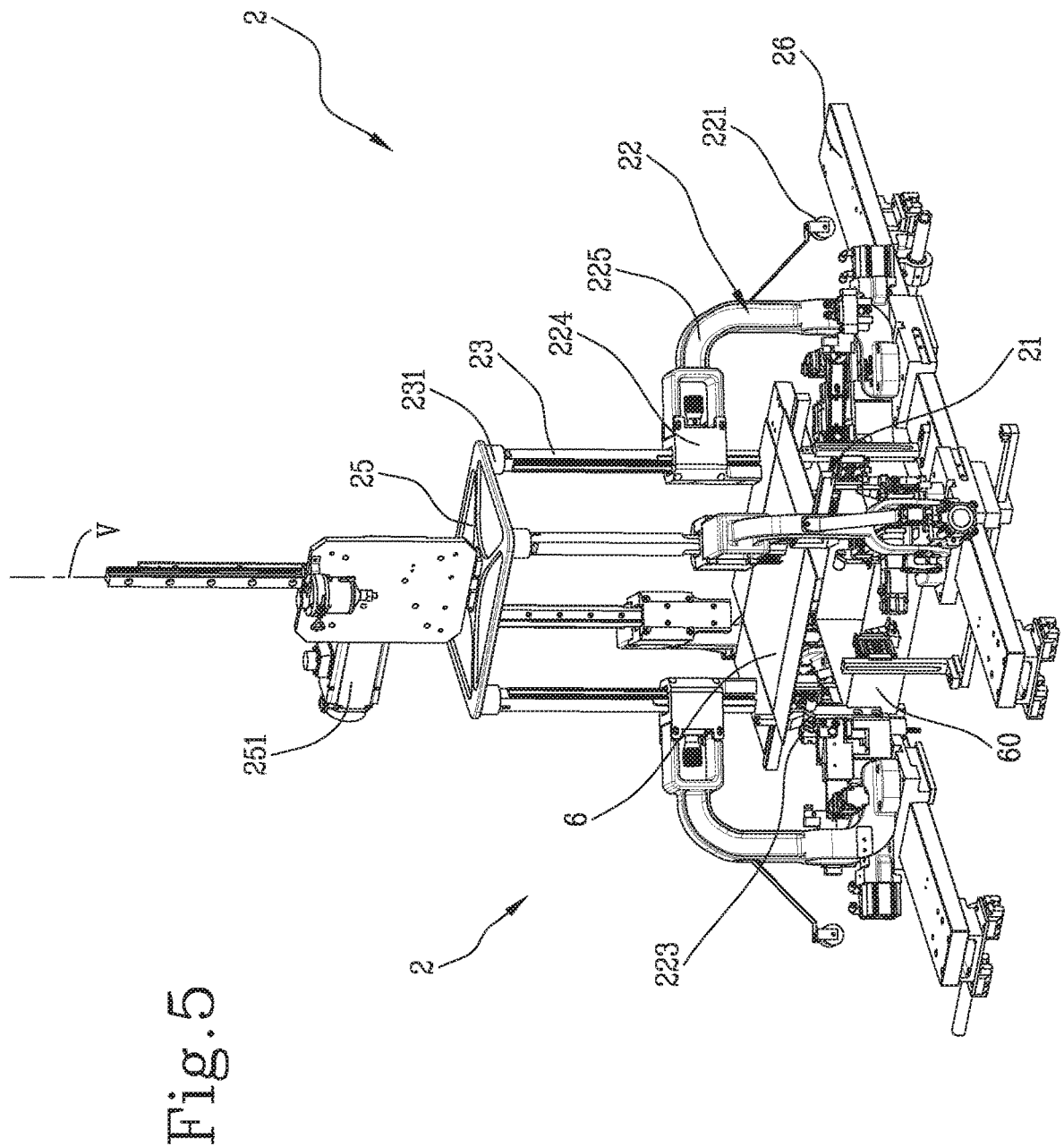
FIGS. 5 and 6 illustrate details of the forming machine of FIG. 4.
Figure 6:
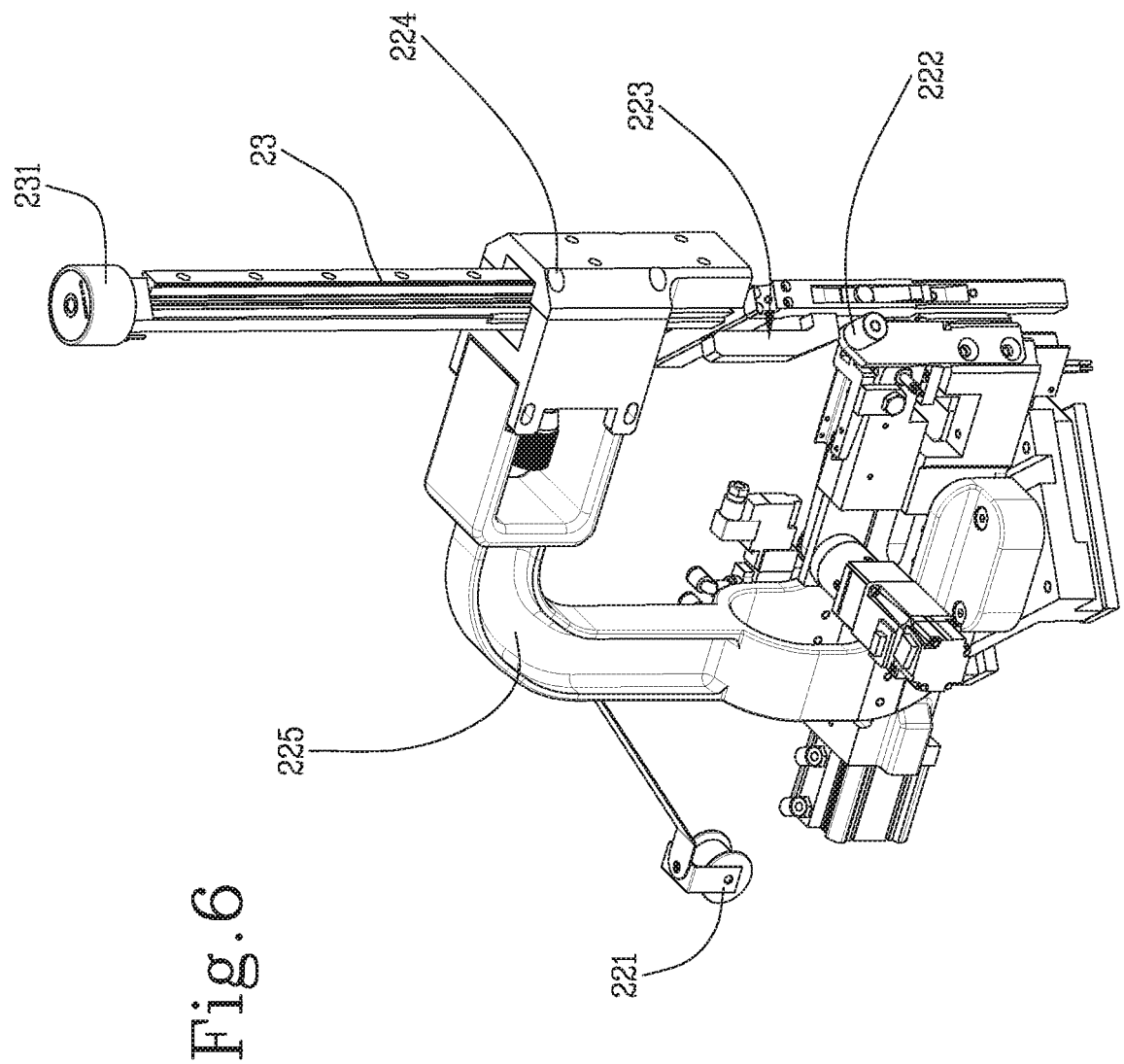
Figure 9:
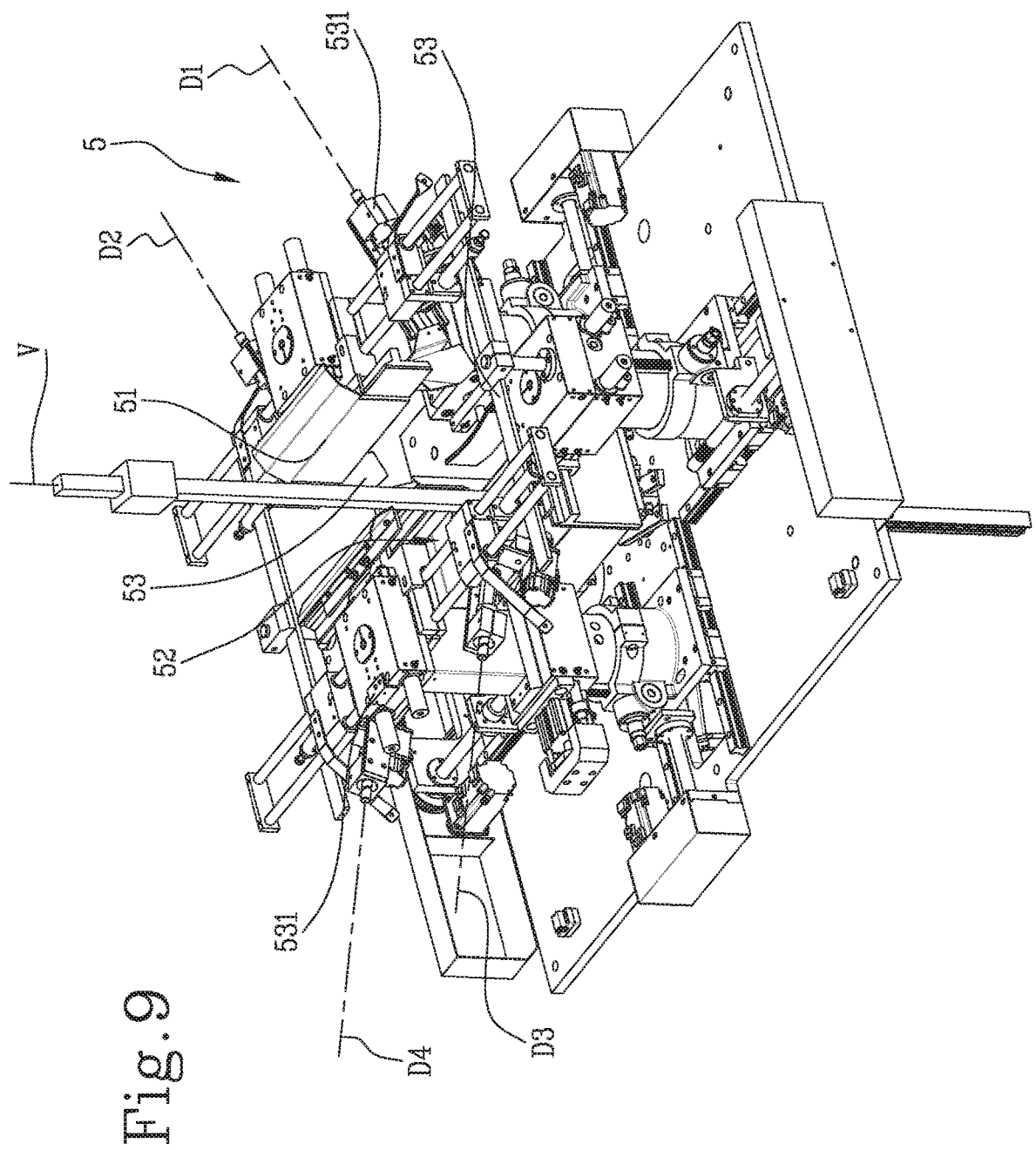
FIG. 9 illustrates a covering machine according to this disclosure.
Figure 10:
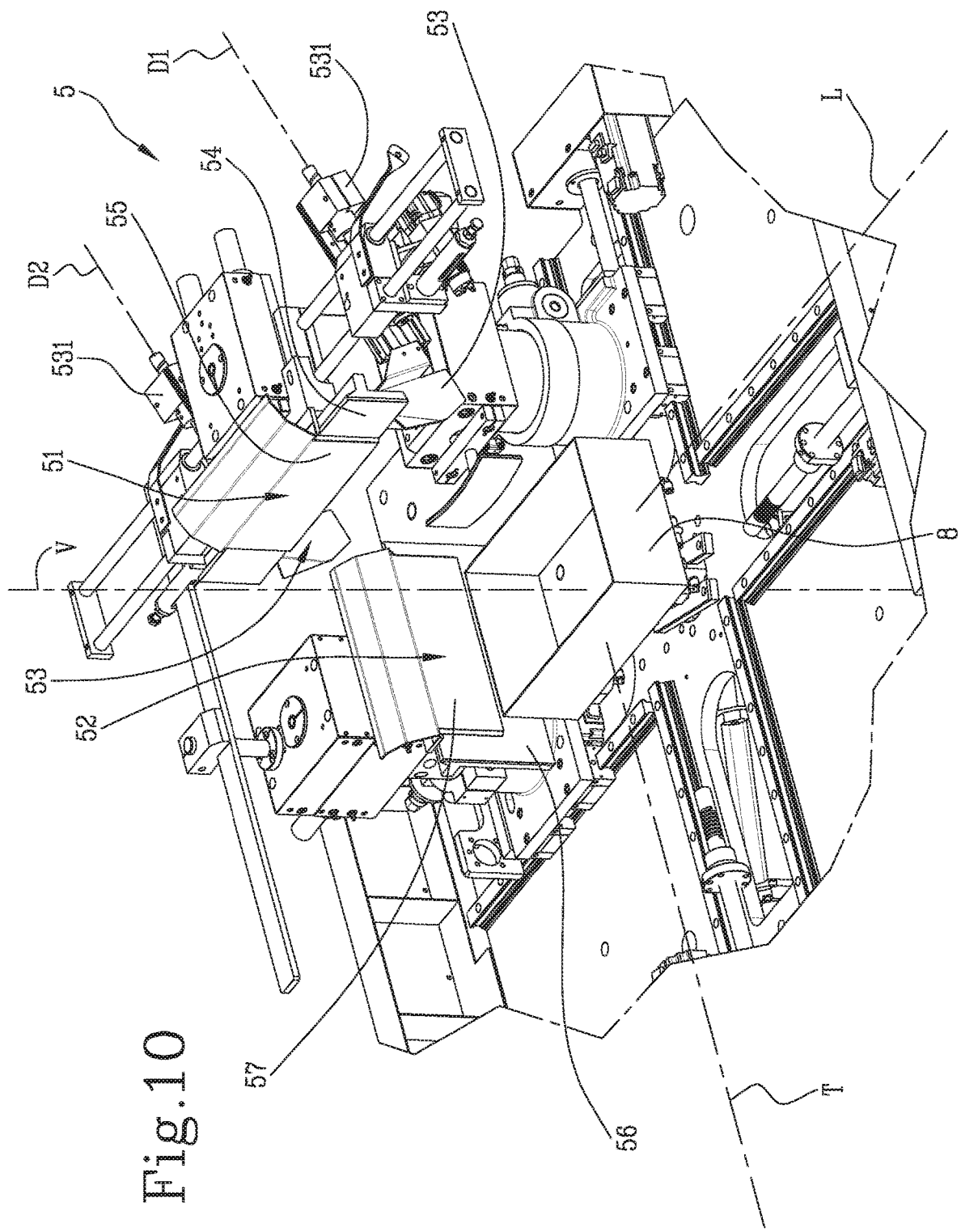
FIG. 10 illustrates a detail of the covering machine of FIG. 9.

This disclosure provides a production line 1 for making a covered box 8.

The production line 1 comprises a forming machine 2. The forming machine 2 is configured to receive a cardboard box blank 6 and to fold it to form a box 60 (not covered).

The box blank 6 comprises a base 6a and side panels 6b, 6c, 6d, 6e connected to the base 6a. The base 6a is configured to define a base wall of the box 60. The side panels 6b, 6c, 6d, 6e are foldable to define a side wall of the box 60.

The forming machine 2 comprises a working zone, configured to receive the blank 6.

The forming machine 2 comprises a plurality of folders 21 positioned in the working zone and configured to interact with the side panels 6b, 6c, 6d, 6e of the blank 61. While the side panels 6b, 6c, 6d, 6e are being folded, the folders 21 remain stationary. The folders 21 may move in the horizontal plane (by means of respective actuators) to adapt to the size of the box 60 to be formed.

The forming machine 2 comprises a movement system, configured to move the blank in a vertical direction V, while keeping the base 6a of the blank 6 oriented horizontally. More specifically, the movement system moves the box blank 6 from a first vertical height (at which the box blank 6 is received in the working zone) to a second vertical height, lower than the first vertical height. In moving from the first vertical height to the second vertical height, the side panels 6b, 6c, 6d, 6e of the box blank 6 interact with the folders 21 and are folded as they move into a vertical position.

The forming machine 2 comprises a plurality of heads 22 (more specifically, if the forming machine 2 is a quadrangular machine to form boxes 60 having four vertical edges, the forming machine 2 comprises four heads 22).

Each head 22 comprises a feeder 221, configured to unroll a piece of sealing tape and to place it in proximity to a vertical edge of the box 60.

Each head 22 comprises a presser 222, configured to press the piece of sealing tape against the respective vertical edge from the outside of the internal space inside the box 60.

Each head 22 includes a cutter 223 configured to cut the sealing tape in order to isolate the piece from it.

It should be noted that the presser 222 is disposed at a vertical height which is lower than the height at which the box blank 6 is fed to the forming machine 2: in effect, the presser is configured to interact with a vertical edge of the box 60 when the side wall of the box 60 is in an erect position (parallel to the vertical direction V).

The movement system comprises a plurality of columns 23 (more specifically, if the forming machine 2 is a quadrangular machine to form boxes 60 having four vertical edges, the forming machine 2 comprises four columns 23). The columns 23 extend in the vertical direction V. The movement system comprises a plate 25, located above the columns 23 and removably fixable to the columns 23 (specifically, to an upper end of them). The plate 25 is oriented in the horizontal plane, perpendicular to the vertical direction V. It should be noted that although this disclosure uses the term "plate", any element that is removably fixable to the columns 23 (not necessarily in the shape of a plate) can be used instead of a plate.

The movement system comprises an actuator 251 for the plate, configured to lift and lower the plate 25. The plate actuator 251 comprises a rack (oriented in the vertical direction) and a pinion, movable on the rack.

At a respective upper end of it, each column 23 comprises a magnet 231 magnetically attachable to the plate 25.

The forming machine 2 is operable in a working configuration, in which the columns 23 are fixed to the plate 25 and move with reciprocating motion in the vertical direction V, and in a size changeover configuration, in which the columns 23 are detached from the plate 25 (and, by effect of gravity, are at a minimum vertical height).

Each head 22 comprises a vertically oriented guide 224, to which a respective column 23 is slidably coupled. In the size changeover configuration, the columns 23 are moved towards and away from each other from the heads 22.

Each head 22 comprises a beam 225, which connects the guide 224 with a heat sealing unit including the cutter 223, the presser 222 and the feeder 221. Preferably, the beam 225 is in the shape of a double T (to increase its mechanical strength). Preferably, the beam 225 extends between a first end, connected to the heat sealing unit (that is, the cutter 223, the presser 222 and the feeder 221) and a second end, connected to the guide 224; the second end is at a greater vertical height compared to the first end.

In each head 22, the heat sealing unit (including the cutter 223 and the presser 222) is preferably movable relative to the beam towards and away from the other heads 22; the heat sealing unit is movable relative to the beam 225 by means of a respective actuator (preferably pneumatic). In effect, the beam 22 moves during changeover and remains stationary during work (that is, while the blank is being folded). During work, the heat sealing unit moves forward to interact with the vertical edge of each box 60 to seal it and, once the edge has been sealed, withdraws to expel the box 60.

Also, preferably, each head 22 comprises an adjustment device to vary the horizontal distance between the guide 224 of the column 23 and the heat sealing unit. This adjustment is useful to take into account the thickness of the paper or cardboard.

The forming machine 2 comprises a plurality of crossbars 26 (specifically, a first and a second crossbar). Each crossbar 26 is oriented in a crossbar direction, at right angles to the vertical direction V. Each head 22 is mounted on a crossbar 26 and is slidable on the crossbar 26 (by means of actuators). Preferably, the crossbars 26 are parallel to each other. In detail, the first and the second crossbar 26 each have two heads 22 mounted on them.

The forming machine 2 also comprises a plurality di guides 27 for the crossbars 26. The guides 27 extend in a direction at right angles to the direction of the crossbars. The crossbars 26 are slidably coupled to the guides 27 to move in the direction at right angles to the direction of the crossbars. Thus, the heads 22 can move in the horizontal plane through the movement of the heads 22 themselves on the crossbars 26 and of the crossbars 26 on the guides 27.

The forming machine 2 also comprises a plurality di guides 28 for feeding the blank 6. The guides 28 are oriented parallel to each other. The guides 28 are positioned at a vertical height intermediate between the guides 224 of the columns 23 and the pressers 222.

The production line 1 comprises a gluing unit 3. The gluing unit 3 is configured to receive a covering blank 7 and to spread glue on the covering blank 7. More specifically, the gluing unit 3 is configured to spread glue selectively on portions 70 of the covering blank 7.

The covering blank 7 includes a base 7a and a plurality of side panels 7b, 7c, 7d, 7e connected to the base 7a. More specifically, the covering blank 7 includes a pair of longitudinal side panels 7b, 7c and a pair of transverse panels 7d, 7e. The base 7a has a pair of longitudinal peripheries, which the longitudinal panels 7b, 7c are connected to, and a pair of transverse peripheries, which the transverse panels 7d, 7e are connected to.

The panels 7b, 7c, 7d, 7e each in turn comprises a respective lower wing 7b', 7c', 7d', 7e', connected to the base 7a, and a respective upper wing 7b", 7c", 7d", 7e", connected to the respective lower wing 7b', 7c', 7d', 7e'. The covering blank 7 also includes a plurality of fold-over flaps 7f, 7g, 7h, 7i, connected to the longitudinal panels 7b, 7c. More specifically, the fold-over flaps 7f, 7g, 7h, 7i are connected to lower wings 7b', 7c' of the longitudinal panels 7b, 7c. In effect, each lower wing 7b', 7c' comprises a first longitudinal periphery connected to the base 7a, a second longitudinal periphery, opposite to the first longitudinal periphery and connected to the respective upper wing 7b", 7c", a first transverse periphery connected to a first fold-over flap 7f, 7h and a second transverse periphery, opposite to the first transverse periphery, connected to the second fold-over flap 7g, 7i. It should be noted that the longitudinal panels 7b, 7c, together with the fold-over flaps 7f, 7g, 7h, 7i, form longitudinal sides of the covering blank 7. The transverse panels 7d, 7e form transverse sides of the covering blank 7.

The portions 70 on which the gluing unit 3 spreads the glue are located on the upper wings 7b", 7c", 7d", 7e" (both longitudinal and transverse) and on the lower, transverse wings 7e' and 7d'.

The production line 1 comprises a positioning device 4. The production line (the positioning device 4) includes a belt 41. The belt 41 is configured to receive the covering blank 7 and to convey it along a feed direction A. The belt 41 includes a first portion 41A having a first colour and a second portion 41B having a second colour, different from the first colour. The covering blank 7 is received on the positioning device 4 with a first part of the blank positioned on the first portion 41A of the belt 41 and a second part of the blank positioned on the second portion 41B of the belt 41.

The production line (the positioning device 4) includes a frame 44. The frame 44 has the function of supporting the belt 41. The frame 44 includes a box-shaped body that defines an internal space inside it. The frame 44 has a top face 44A and an underside face. On the top face of the frame 44, at least one (first) portion is provided with holes 45. It should be noted that the holes 45 illustrated in FIG. 8 are, for convenience of illustration, shown only on a limited portion of the top face of the frame; in actual fact, holes 45 are made on a wider surface of the top face of the frame 44.

The production line (the positioning device 4) includes a suction pump or a compressor) to generate a negative pressure in the internal space of the frame 44 so as to create a suction effect through the holes 55. Since the belt 41, one stretch of which is slidably disposed on the top face of the frame 44, is in turn permeable to air, the air flow generated by the holes 45 facilitates adherence of the blanks to the belt 41.

On the top face of the frame 44, at least one (second) portion 46 is transparent. Preferably, the holes 45 do not extend to the transparent portion 46 (but may extend to the entire remaining portion of the top face of the frame 44).

The production line (the positioning device 4) may also include one or more lighting bodies 47 to illuminate the belt 41. In an embodiment, the frame 44 includes the one or more lighting bodies 47, which are configured to light the belt 41 from below, that is, from the opposite side of it with respect to the cameras 43A and 43B. For example, the lighting bodies 47 may be positioned inside the frame 44 (for example, inside its internal space); preferably, the lighting bodies 47 are configured to generate light beams that pass through the transparent portion 46 (of the top face) of the frame. For example, the transparent portion 46 is (operatively) interposed between the cameras 43A and 43B and the lighting bodies 47. In an example embodiment, the transparent portion 65 may also be provided with the holes 45.

The belt 41 may be back-lit (for example in the embodiment with the lighting bodies 47 just described) in order to show up the colour contrasts in the images captured by the cameras 43A and 43B.

The back-lighting may be continuous or stroboscopic. The back-lighting may be obtained at different frequencies (that is, wavelengths); for example, it may be in the visible, ultraviolet or infrared spectrum.

The positioning device 4 also includes a first pair of cameras 43A, configured to capture images of the first part of the covering blank 7, positioned on the first portion 41A of the belt 41, and a second pair of cameras 43B, configured to capture images of the second part of the covering blank 7, positioned on the second portion 41B of the belt 41. The positioning device 4 includes a control unit, configured to selectively activate the first or the second pair of cameras 43A, 43B and to capture in succession two images of the first or the second part of the covering blank 7 with the activates pair of cameras 43A, 43B.

The positioning device 4 includes a placing element 42, including a pushing element 421. The pushing element 421 is movable along the vertical direction. More specifically, the placing element 42 includes an actuator configured to lift and lower the pushing element 421. The actuator of the placing element 42 may, for example, include a rail oriented vertically and a shoe slidable on the rail and integral with the pushing element 421. The pushing element 421 is configured to interact with the base wall of the box 60 to move it to the placing position on the base 7a of the covering blank 7.

The production line 1 also comprises a covering machine 5, configured to receive the box 60 coupled to the respective covering blank 7 from the positioning device 4 and to fold the covering blank 7 into contact with the box 60 in such a way as to cover the box to make the covered box 8.

The covering machine 5 comprises a plate which is movable along a vertical direction V. The plate is configured to receive the covering blank 7 and the box 60 and to move them along the vertical direction V, from the top down. The covering machine 5 comprises a plate actuator, configured to move the plate along the vertical direction V; the plate actuator may, for example, include a rail oriented vertically and a shoe slidably coupled to the rail (where the plate is connected to the shoe).

The covering machine 5 comprises a first folding station 51, configured to interact with longitudinal sides of the covering blank 7 (during the downward movement of the covering blank 7 and box 60), disposing the longitudinal sides in the longitudinal vertical plane, with the longitudinal panels 7b, 7c (specifically, with the lower wings 7b', 7c' of the longitudinal panels 7b, 7c) into contact with the outside surface of corresponding longitudinal side walls of the box 60.

The first folding station 51 also comprises folders for folding the upper wings 7b", 7c" of the covering blank 7 towards the inside of the box, from an erect position to a horizontal position. The first folding station 51 also comprises folders (which may coincide with the folders just mentioned) to fold the upper wings 7b", 7c" of the longitudinal panels of the blank into contact with the inside faces of the corresponding side walls of the box. The first folding station 51 also comprises pressers which, for each side wall of the box, press towards each other the upper and lower wings of the blank, coupled respectively to the inside and outside face of the longitudinal side wall itself. The pressers comprise: abutment plates 54 disposed on the outside of the box to prevent the corresponding side walls of the box 60 placed in contact therewith from being pushed outwards; pressing elements 55 movable relative to the corresponding abutment plates 54 by translation along a horizontal direction parallel to the base of the box and insertable into the box 60 to move, when inside the box 60, towards the corresponding abutment plates 54 and parallel therewith, so as to press the longitudinal side walls of the box 60, which are interposed between the abutment plates 54 and the corresponding pressing elements 55.

The covering machine 5 comprises a plurality of intermediate folders 53, each of which is configured to fold a corresponding fold-over flap 7f, 7g, 7h, 7i, causing it to be folded from the longitudinal vertical plane to the transverse vertical plane and positioned in contact with the transverse side walls of the box 60.

The intermediate folders 53 are movable between a withdrawn position, where they are spaced apart from each other, and an advanced position, where they are close together to interact with the fold-over flaps 7f, 7g, 7h, 7i. The intermediate folders 53 are movable along respective oblique movement directions D1, D2, D3, D4, including a vertical component parallel to the vertical direction V and a transverse component parallel to the transverse direction T, so that, at the withdrawn position, the intermediate folders 53 are at a first vertical height and, at the advanced position, the intermediate folders 53 are at a second vertical height, lower than the first vertical height.

For each intermediate folder 53, the covering machine 5 comprises a respective actuator 531, configured to move the intermediate folder 53 between the withdrawn position and the close-together position. Preferably, the actuators 531 of the intermediate folders 53 are driven by brushless motors.

The covering machine 5 comprises a second folding station 52, configured to fold transverse sides of the covering blank 7, disposing them in the transverse vertical plane, with the transverse panels 7d, 7e (specifically, with the lower wings 7d', 7e' of the longitudinal panels 7d, 7e) in contact with an outside surface of corresponding transverse side walls of the box 60 (and with the fold-over flaps 7f, 7g, 7h, 7i already folded by the intermediate folders 53).

The second folding station 52 also comprises folders for folding the upper wings 7d", 7e" of the covering blank 7 towards the inside of the box 60, from an erect position to a horizontal position. The second folding station 52 also comprises folders (which may coincide with the folders just mentioned) to fold the upper wings 7d", 7e" of the longitudinal panels of the blank into contact with the inside faces of the corresponding side walls of the box. The second folding station 52 also comprises pressers which, for each longitudinal side wall of the box, press towards each other the upper and lower wings of the blank, coupled respectively to the inside and outside face of the transverse side wall itself. The pressers of the second folding station 52, like those of the first folding station 51, comprise: abutment plates 56 disposed on the outside of the box to prevent the corresponding side walls of the box 60 placed in contact therewith from being pushed outwards; pressing elements 57 movable relative to the corresponding abutment plates 56 by translation along a horizontal direction parallel to the base of the box and insertable into the box 60 to move, when inside the box 60, towards the corresponding abutment plates 57 and parallel therewith, so as to press the transverse side walls of the box 60, which are interposed between the abutment plates 56 and the corresponding pressing elements 57.

The intermediate folders 53 are interposed, along the vertical direction V, between the first and the second folding station 51, 52.

Preferably, changeover is performed by replacing the folders of the first folding station 51 and of the second folding station 52 (and, if necessary, replacing the plate). Changeover does not, however, require replacing the intermediate folders 53.

The following paragraphs, listed in alphanumeric order for reference, are non-limiting example modes of describing this invention.

A0. A forming machine for forming a box from a paper or cardboard blank including a base, configured to define a base wall of the box and side panels, connected to the base and foldable to define a side wall of the box, wherein the forming machine comprises:

a working zone, configured to receive the blank;

a plurality of folders positioned in the working zone and configured to interact with the side panels of the blank to fold them and dispose them parallel to a vertical direction, with respective lateral peripheries juxtaposed to define vertical edges of the side wall of the box, so that the side panels of the blank delimit an internal space inside the box;

a plurality of columns, extending along the vertical direction and movable along the vertical direction, where each column of the plurality of columns can be placed in the internal space inside the box, to abut against a respective vertical edge.

A. The forming machine according to paragraph A0, comprising a plurality of heads, wherein each head of the plurality of heads includes a presser, to abut against a corresponding vertical edge from the outside of the space inside the box, so that each column of the plurality of columns can be placed in the internal space inside the box, at a position in front of a respective presser to abut against a respective vertical edge of the side wall of the box, the vertical edge being operatively interposed between the column itself and the presser.

A1. The forming machine according to paragraph A, wherein the heads of the plurality of heads are movable towards and away from each other.

A1.1. The forming machine according to paragraph A, wherein the heads of the plurality of heads are movable towards and away from each other in synchronized manner.

A1.2. The forming machine according to paragraph A1 or paragraph A1.1 wherein each head of the plurality of heads is movable in a horizontal plane, perpendicular to the vertical direction, between a withdrawn position, where it does not interfere with the box positioned in the working zone, and an advanced position, where it operates on a respective vertical edge of the box.

A1.3. The forming machine according to paragraph A1 or paragraph A1.2, wherein each head of the plurality of heads is configured to move the column associated with it in the horizontal plane.

A2. The forming machine according to any one of paragraphs A to A1.1, wherein each head of the plurality of heads includes:
- a feeder, configured to place a piece of sealing tape so it faces a respective vertical edge,
- a cutter, configured to cut the sealing tape in order to isolate the piece from it,
- wherein the presser is configured to press the piece of sealing tape against the respective vertical edge from the outside of the internal space inside the box.

A3. The forming machine according to any one of paragraphs from A to A2, wherein each column of the plurality of columns is associated with a respective head of the plurality of heads.

A3.1. The forming machine according to paragraph A3, wherein each head of the plurality of heads includes a vertically oriented guide, wherein each column of the plurality of columns is slidably coupled to the guide of the respective head.

A3.1.1. The forming machine according to paragraph A3.1, wherein, for each head of the plurality of heads, the guide is positioned at a different vertical height relative to the corresponding presser.

A3.1.1.1. The forming machine according to paragraph A3.1.1, wherein, for each head of the plurality of heads, the guide is positioned at a greater vertical height relative to the corresponding presser.

A4. The forming machine according to any one of paragraphs from A0 to A3.1.1.1, comprising a plate, movable vertically and located above the columns, wherein the columns of the plurality of columns are removably connectable to the plate so that the machine is operable in a working configuration in which the columns are connected to the plate to move vertically therewith and in a changeover configuration, in which the columns are disconnected from the plate and are movable horizontally as one with the heads.

A4.1. The forming machine according to paragraph A4, comprising a plurality of heads, wherein each head of the plurality of heads includes a vertically oriented guide, wherein each column of the plurality of columns is slidably coupled to the guide of the respective head and wherein the plate is located above the guides.

A4.2. The forming machine according to paragraph A4 or paragraph A4.1, wherein the plate includes a ferromagnetic material and wherein each column of the plurality of columns includes, at an upper end of it, a magnet that can be magnetically coupled to the plate.

A4.2.1. The forming machine according to paragraph A4.2 comprising an electric circuit including, for each column, an electrical winding that is traversable by an energizing current to generate a magnetic force able to oppose and cancel a magnetic force inherent in the respective magnet, the inherent magnetic force of the magnets being an attractive force between the magnets and the plate.

A5. The forming machine according to any one of paragraphs from A to A4.2.1, wherein each head of the plurality of heads includes a vertically oriented guide, to which a respective column of the plurality of columns is coupled, and a cutter, configured to cut a sealing tape, wherein, for each head of the plurality of heads, the corresponding guide is located at a predetermined distance from the respective cutter, relative to a horizontal direction of movement of the cutter, at an advanced position towards the corresponding guides of the other heads of the plurality of heads.

A5.1. The forming machine according to paragraph A5, comprising, for each head of the plurality of heads, an adjustment device for varying the predetermined distance between the guide and the corresponding cutter.

B. A method for forming a box from a paper or cardboard blank (or a method for using a box forming machine for forming a box from a paper or cardboard blank), the blank including a base, configured to define a base wall of the box and side panels, connected to the base and foldable to define a side wall of the box, wherein the method comprises the following steps:
- positioning the blank in a working zone;
- folding the side panels of the blank to dispose them parallel to a vertical direction, with respective lateral peripheries juxtaposed to define vertical edges of the side wall of the box, so that the side panels of the blank delimit an internal space inside the box;
- sealing the vertical edges by means of a plurality of pressers, the step of sealing including at least one sub-step of pressing the vertical edges, by means of the plurality of pressers, operatively disposed on the outside of the internal space inside the box, wherein the method comprises the following steps:
preparing a plurality of columns (23);
moving the columns (23) in the vertical direction (V) so that during the step of sealing, each vertical edge is interposed between a respective presser (222) of the plurality of pressers and a respective column (23) of the plurality of columns (23).

B1. The method according to paragraph B, wherein, during the step of sealing, the pressers move towards each other.

B1.1. The method according to paragraph B1, wherein, during the step of sealing, the pressers move towards each other in synchronized manner.

B1.2. The method according to any one of paragraphs from B to B1.1, wherein the step of sealing further includes, for each vertical edge, the following sub-steps:
- feeding a piece of sealing tape so it faces the vertical edge, by means of a feeder forming part of the head;
- applying the piece of sealing tape to the vertical edge on the outside of the internal space of the box, by means of a presser which is disposed on the outside of the internal space of the box and which moves towards the vertical edge of the box;
- cutting the sealing tape in order to isolate the piece, using a cutter forming part of the head.

B2. The method according to any one of paragraphs from B to B1.2, wherein, during the step of folding, the columns of the plurality of columns are integral with a plate and move along the vertical direction by effect of the lifting and/or lowering of the plate.

B2.1. The method according to paragraph B, wherein, during the step of folding, the plate which the columns are fixed to inhibits movement of the columns of the plurality of columns in the horizontal plane.

B3. The method according to any one of paragraphs from B to B2.1, comprising a step of size changeover including a step of moving the columns towards and away from each other in a horizontal plane perpendicular to the vertical direction.

B3.1. The method according to paragraphs B3, wherein, during the step of folding, the columns of the plurality of columns are integral with a plate and move along the vertical direction by effect of the lifting and/or lowering of the plate and, during the step of size changeover, the columns of the plurality of columns are detached from the plate and move in the horizontal plane.

B3.1.1. The method according to paragraph B3.1, wherein, during the step of size changeover, the columns are moved in the horizontal plane by respective sealing heads, wherein on each sealing head one of the pressers is mounted.

B4. The method according to any one of paragraphs from B to B3.1.1, wherein the step of folding includes moving the blank along the vertical direction by means of the columns of the plurality of columns, which abut against the base of the blank and move along the vertical direction, pushing the blank along the vertical direction with them, and wherein, during the movement of the blank, the side panels interact with a plurality of folders positioned in the working zone on the outer side relative the plurality of columns.

C. A gluing unit, configured to receive a covering blank and to spread glue on the covering blank, wherein the covering blank includes a base, a plurality of panels connected to the base and a plurality of fold-over flaps connected to the panels.

C1. The gluing unit according to paragraph C, including a delivery nozzle configured to deliver glue at a high temperature selectively on portions of the covering blank.

C1.1. The gluing unit according to paragraph C1, wherein the covering blank includes a base and a plurality of side panels connected to the base, wherein the at least one nozzle is configured to apply glue at a high temperature selectively on portions of the surfaces of the side panels of the plurality of side panels.

C1.1.1. The gluing unit according to paragraph C1.1, wherein the covering blank also includes a plurality of fold-over flaps, connected to the longitudinal panels, wherein the at least one nozzle is configured to deliver glue at a high temperature on portions of the covering blank different from the fold-over flaps, so that the fold-over flaps of the covering blank are free of glue when they leave the gluing unit.

D. A positioning device, configured to receive a formed box and a covering blank and to position the box on the covering blank in such a way that the base wall of the box rests on the base of the covering blank.

D1. The positioning device according to paragraph D, including:
  a belt, configured to receive the covering blank and to convey it along a feed direction,
  a placing element, movable between a pickup position to receive the box and a placing position to place the box at a predetermined position on the covering blank being conveyed by the belt;
  a control unit;
  at least one camera, which is configured to capture an image of the covering blank located on the belt and which is connected to the control unit, wherein the control unit is configured to compare the image captured by the camera with a reference model previously stored and to modify the placing position of the placing element as a function of the comparison between the image captured by the camera and the reference image.

D1.1. The positioning device according to paragraph D1, wherein the positioning device includes a first pair of cameras and a second pair of cameras, defining the at least one camera, wherein the control unit is configured to selectively activate the first pair of cameras or the second pair of cameras to capture respective images.

D1.1.1. The positioning device according to paragraph D1.1, wherein the belt includes at least a first portion having a first colour and a second portion having a second colour, different from the first colour, wherein the first pair of cameras is configured to capture images of portions of the covering blank located on the first portion of the belt and the second pair of cameras is configured to capture images of portions of the covering blank located on the second portion of the belt.

D2. The positioning device according to any one of paragraphs from D to D1.1.1, comprising a screen, connected to the control unit and configured to display the image captured by the at least one camera.

E. A covering machine, configured receive the box coupled to a respective covering blank, with the base wall of the box resting on the covering blank and to fold the covering blank into contact with the respective box in such a way as to cover the box.

E1. The covering machine according to paragraph E, wherein the covering blank includes a base and a plurality of side panels connected to the base, wherein the plurality of side panels include longitudinal panels, connected to the base along longitudinal sides of the base, and transverse panels, connected to the base along transverse sides of the base, transverse to the longitudinal sides, wherein the covering blank also includes a plurality of fold-over flaps, connected to the longitudinal panels, wherein the covering machine comprises:
  a plate, which is movable along a vertical direction, the plate being configured to receive the covering blank and the box, with the base of the covering blank coupled to the base wall of the box, wherein the longitudinal side walls of the box received by the plate are oriented along a longitudinal vertical plane, parallel to the vertical direction and to a longitudinal direction, and the transverse side walls are oriented along a transverse vertical plane, parallel to the vertical direction and to a transverse direction,
  a first folding station, configured to fold longitudinal sides of the covering blank, disposing them in the longitudinal vertical plane, with the longitudinal panels in contact with an outside surface of corresponding longitudinal side walls of the box;
  a second folding station, configured to fold transverse sides of the covering blank, disposing them in the transverse vertical plane, with the transverse panels in contact with an outside surface of corresponding transverse side walls of the box,
  a plurality of intermediate folders, each of which is configured to fold a corresponding fold-over flap, causing it to be folded from the longitudinal vertical plane to the transverse vertical plane and positioned in contact with the transverse side walls of the box.

E1.1. The covering machine according to paragraph E1, wherein the intermediate folders are movable along respective oblique movement directions, including a vertical component along the vertical direction and a transverse component parallel to the transverse direction.

E1.2. The covering machine according to paragraph E1 or paragraph E1.1, wherein the intermediate folders are movable between a withdrawn position, where they are spaced apart from each other, and an advanced position, where they are close together.

E1.2.1. The covering machine according to paragraph E1.2, wherein, at the withdrawn position, the intermediate folders are at a first vertical height and, at the advanced position, the intermediate folders are at a second vertical height, different from the first vertical height.

E1.2.1.1. The covering machine according to paragraph E1.2.1, wherein the first folding station and the second folding station are located at respective heights, offset along the vertical direction, and wherein the second vertical height of the intermediate folders is interposed between the heights of the first and the second folding station.

E1.3. The covering machine according to any one of paragraphs from E.1 to E1.2.1.1, wherein the plate of the covering machine includes a suction pad configured to hold an inside face of the base wall of the box.

E2. The covering machine according to any one of paragraphs from E to E1.3, wherein each side panel of the plurality of side panels includes a lower wing connected to the base and an upper wing connected to the lower wing, wherein the first and second folding stations are configured to fold the lower wings into contact with the side wall of the box and wherein the covering machine includes:
- a third folding station, configured to fold the upper wings towards the inside of the box, disposing them horizontally;
- a fourth folding station, configured to fold the upper wings of the covering blank, disposing them in contact with the inside surface of the side walls of the box;
- pressers, configured to press towards each other the upper wings and the lower wings, coupled respectively to the inside and the outside surface of the side wall of the box.

F. A production line for making a covered box, comprising:
- a forming machine according to any one of paragraphs from A to A5.1, wherein the forming machine includes a plurality of folders and a movement system configured to receive the box blank oriented horizontally and to move it along a vertical direction, wherein the folders are configured to interact with the side panels to fold them vertically as the box blank moves along the vertical direction;
- a gluing unit according to any one of paragraphs from C to C1.1.1;
- a positioning device according to any one of paragraphs from D to D2, configured to receive the box from the forming machine and the covering blank from the gluing unit;
- a covering machine according to any one of paragraphs from E to E2, configured to receive the box coupled to the respective covering blank from the positioning device.

F1. The production line according to paragraph F, wherein the movement system of the forming machine comprises a plurality of columns, extending along the vertical direction, and configured to abut against the base of the box blank received in the forming machine, wherein the columns of the plurality of columns are movable along the vertical direction to push the box blank in the vertical direction.

F1.1. The production line according to paragraph F1, wherein the columns of the plurality of columns are movable in a horizontal plane perpendicular to the vertical direction, towards and away from each other between at least a first configuration for forming boxes of a first size, and a second configuration for forming boxes of a second size, different from the first size.

G. A method for making a covered box, comprising the following steps:
- forming a box from a cardboard box blank, wherein the box blank includes a base, configured to define a base wall of the box and side panels, connected to the base and foldable to define a side wall of the box, wherein the step of forming includes moving the box blank along a vertical direction, wherein, during this movement, the base of the box blank is oriented horizontally and the side panels interact with folders which cause them to be folded vertically;
- gluing, including spreading glue on a covering blank that includes a base, a plurality of panels connected to the base and a plurality of fold-over flaps connected to the panels;
- positioning the box on the covering blank in such a way that the base wall of the box rests on the base of the covering blank;
- covering, including folding the covering blank into contact with the box.

G1. The method according to paragraph G, wherein, during the step of forming, the box blank is moved by the plurality of columns which extend along the vertical direction and which move vertically to abut against the base wall of the box blank, so as to push it in the vertical direction.

G1.1. The method according to paragraph G1, comprising a step of size changeover, including moving the columns in a horizontal plane perpendicular to the vertical direction, towards and away from each other between at least a first configuration for forming boxes of a first size, and a second configuration for forming boxes of a second size, different from the first size.

G2. The method according to paragraph G or paragraph G1, wherein the step of gluing includes selectively applying glue on portions of the covering blank.

G2.1. The method according to paragraph G2, wherein the covering blank includes a base and a plurality of side panels connected to the base, the glue being applied at a high temperature selectively on portions of the surfaces of the side panels of the plurality of side panels.

The invention claimed is:

1. A production line for making a covered box, comprising:
- a forming machine, configured to receive a cardboard box blank and to fold it to form the box, wherein the box blank includes a base, configured to define a base wall of the box and a plurality of side panels, connected to the base and foldable to define longitudinal side walls and transverse side walls of the box, and wherein the forming machine includes a plurality of folders and a movement system configured to receive the box blank oriented horizontally and to move it along a vertical direction, wherein the folders are configured to interact with the side panels to fold them along the vertical direction;
- a gluing unit, configured to receive a paper covering blank and to spread glue on the covering blank, wherein the covering blank includes a base, a plurality of panels connected to the base and a plurality of fold-over flaps connected to the panels;
- a positioning device, configured to receive the box from the forming machine (2) and the covering blank from the gluing unit and to position the box on the covering blank in such a way that the base wall of the box rests on the base of the covering blank;
- a covering machine, configured receive the box coupled to the respective covering blank from the positioning device and to fold the covering blank into contact with the box in such a way as to cover the box,
- wherein the movement system of the forming machine comprises a plurality of columns, extending along the vertical direction, and configured to abut against the base of the box blank received in the forming machine, wherein the columns of the plurality of columns are movable along the vertical direction to push the box blank in the vertical direction, wherein the plurality of side panels includes longitudinal panels, connected to the base along longitudinal sides of the base, and transverse panels, connected to the base along transverse sides of the base, transverse to the longitudinal sides, wherein the covering blank also includes a plurality of fold-over flaps, connected to the longitudinal panels, wherein the covering machine comprises:

a plate, which is movable along a vertical direction, the plate being configured to receive the covering blank and the box, with the base of the covering blank coupled to the base wall of the box, wherein the longitudinal side walls of the box received by the plate are oriented along a longitudinal vertical plane, parallel to the vertical direction and to a longitudinal direction, and the transverse side walls are oriented along a transverse vertical plane, parallel to the vertical direction and to a transverse direction, a first folding station, configured to fold longitudinal sides of the covering blank, disposing them in the longitudinal vertical plane, with the longitudinal panels in contact with an outside surface of corresponding longitudinal side walls of the box;

a second folding station, configured to fold transverse sides of the covering blank, disposing them in the transverse vertical plane, with the transverse panels in contact with an outside surface of corresponding transverse side walls of the box, a plurality of intermediate folders, each of which is configured to fold a corresponding fold-over flap, causing it to be folded from the longitudinal vertical plane to the transverse vertical plane and positioned in contact with the transverse side walls of the box.

2. The production line according to claim 1, wherein the column of the plurality of columns are movable in a horizontal plane perpendicular to the vertical direction, towards and away from each other between at least a first configuration for forming boxes of a first size, and a second configuration for forming boxes of a second size, different from the first size.

3. The production line according to claim 2, wherein the gluing unit may include at least one delivery nozzle configured to deliver hot-melt glue selectively on portions of the covering blank.

4. The production line according to claim 3, wherein the at least one nozzle is configured to deliver hot-melt glue at a high temperature selectively on limited portions of the surfaces of one or more of the panels of the plurality of panels.

5. The production line according to claim 1, wherein the intermediate folders are movable between a withdrawn position, where they are spaced apart from each other, and an advanced position, where they are close together.

6. The production line according to claim 5, wherein the intermediate folders are movable along respective oblique movement directions, including a vertical component along the vertical direction and a transverse component along the transverse direction, so that, at the withdrawn position, the intermediate folders are at a first vertical height and, at the advanced position, the intermediate folders are at a second vertical height, different from the first vertical height.

7. The production line according to claim 6, wherein the first folding station and the second folding station are located at respective heights, offset along the vertical direction, and wherein the second vertical height of the intermediate folders is interposed between the heights of the first and the second folding station.

8. The production line according to claim 1, wherein the plate of the covering machine includes, on an underside face of it, a suction pad configured to hold an inside face of the base wall of the box.

9. The production line according to claim 1, wherein the positioning device includes:

a belt, configured to receive the covering blank from the gluing unit and to convey it along a feed direction, a placing element, movable between a pickup position to receive the box and a placing position to place the box at a predetermined position on the covering blank being conveyed by the belt;

a control unit;

at least one camera, which is configured to capture an image of the covering blank located on the belt and which is connected to the control unit, wherein the control unit is configured to compare the image captured by the camera with a reference model previously stored and to instruct the placing element to modify the placing position of the placing element as a function of the comparison between the image captured by the camera and the reference image.

10. The production line according to claim 9, wherein the positioning device includes a first pair of cameras and a second pair of cameras, defining the at least one camera, wherein the control unit is configured to selectively activate the first pair of cameras or the second pair of cameras to capture respective images, wherein the belt includes at least a first portion having a first colour and a second portion having a second colour, different from the first colour, wherein the first pair of cameras is configured to capture images of portions of the covering blank located on the first portion of the belt and the second pair of cameras is configured to capture images of portions of the covering blank located on the second portion of the belt.

11. The production line according to claim 10, comprising a screen, connected to the control unit of the positioning device and configured to display the image captured by the at least one camera.

12. The production line according to claim 9, wherein the placing element includes a pushing element, operating on the inside surface of the base wall of the box and movable along the vertical direction, wherein the positioning device further comprises one or more strips, operating on the outside surface of the base wall of the box and movable from a closed configuration, where they are oriented horizontally to support the box, to an open configuration, where they are oriented vertically to enable the pushing element to move the box downwards to the placing position on the covering blank, wherein the positioning device further comprises one or more actuators, configured to move the one or more strips from the closed configuration to the open configuration and vice versa.

13. The production line according to claim 9, wherein the positioning device includes a lighting body, configured to illuminate at least one zone of the belt interposed between the at least one camera and the lighting body.

14. A production line for making a covered box, comprising:

a forming machine, configured to receive a cardboard box blank and to fold it to form the box, wherein the box blank includes a base, configured to define a base wall of the box and side panels, connected to the base and foldable to define longitudinal side walls and transverse side walls of the box, and wherein the forming machine includes a plurality of folders and a movement system configured to receive the box blank oriented horizontally and to move it along a vertical direction, wherein the folders are configured to interact with the side panels to fold them along the vertical direction;

a gluing unit, configured to receive a paper covering blank and to spread glue on the covering blank, wherein the covering blank includes a base, a plurality of panels connected to the base and a plurality of fold-over flaps connected to the panels;

a positioning device, configured to receive the box from the forming machine and the covering blank from the gluing unit and to position the box on the covering blank in such a way that the base wall of the box rests on the base of the covering blank;

a covering machine, configured receive the box coupled to the respective covering blank from the positioning device and to fold the covering blank into contact with the box in such a way as to cover the box, wherein the movement system of the forming machine comprises a plurality of columns, extending along the vertical direction, and configured to abut against the base of the box blank received in the forming machine, wherein the columns of the plurality of columns are movable along the vertical direction to push the box blank in the vertical direction, wherein the positioning device includes:

a belt, configured to receive the covering blank from the gluing unit and to convey it along a feed direction, a placing element, movable between a pickup position to receive the box and a placing position to place the box at a predetermined position on the covering blank being conveyed by the belt;

a control unit;

at least one camera, which is configured to capture an image of the covering blank located on the belt and which is connected to the control unit, wherein the control unit is configured to compare the image captured by the camera with a reference model previously stored and to instruct the placing element to modify the placing position of the placing element as a function of the comparison between the image captured by the camera and the reference image, wherein the positioning device includes a first pair of cameras and a second pair of cameras, defining the at least one camera, wherein the control unit is configured to selectively activate the first pair of cameras or the second pair of cameras to capture respective images, wherein the belt includes at least a first portion having a first colour and a second portion having a second colour, different from the first colour, wherein the first pair of cameras is configured to capture images of portions of the covering blank located on the first portion of the belt and the second pair of cameras is configured to capture images of portions of the covering blank located on the second portion of the belt.

15. The production line according to claim 14, wherein the column of the plurality of columns are movable in a horizontal plane perpendicular to the vertical direction, towards and away from each other between at least a first configuration for forming boxes of a first size, and a second configuration for forming boxes of a second size, different from the first size.

16. The production line according to claim 14, wherein the intermediate folders are movable between a withdrawn position, where they are spaced apart from each other, and an advanced position, where they are close together.

17. The production line according to claim 16, wherein the intermediate folders are movable along respective oblique movement directions, including a vertical component along the vertical direction and a transverse component along the transverse direction, so that, at the withdrawn position, the intermediate folders are at a first vertical height, and, at the advanced position, the intermediate folders are at a second vertical height, different from the first vertical height.

18. A production line for making a covered box, comprising:

a forming machine, configured to receive a cardboard box blank and to fold it to form the box, wherein the box blank includes a base, configured to define a base wall of the box and side panels, connected to the base and foldable to define longitudinal side walls and transverse side walls of the box, and wherein the forming machine includes a plurality of folders and a movement system configured to receive the box blank oriented horizontally and to move it along a vertical direction, wherein the folders are configured to interact with the side panels to fold them along the vertical direction;

a gluing unit, configured to receive a paper covering blank and to spread glue on the covering blank, wherein the covering blank includes a base, a plurality of panels connected to the base and a plurality of fold-over flaps connected to the panels;

a positioning device, configured to receive the box from the forming machine and the covering blank from the gluing unit and to position the box on the covering blank in such a way that the base wall of the box rests on the base of the covering blank;

a covering machine, configured receive the box coupled to the respective covering blank from the positioning device and to fold the covering blank into contact with the box in such a way as to cover the box, wherein the movement system of the forming machine comprises a plurality of columns, extending along the vertical direction, and configured to abut against the base of the box blank received in the forming machine, wherein the columns of the plurality of columns are movable along the vertical direction to push the box blank in the vertical direction, wherein the positioning device includes:

a belt, configured to receive the covering blank from the gluing unit and to convey it along a feed direction, a placing element, movable between a pickup position to receive the box and a placing position to place the box at a predetermined position on the covering blank being conveyed by the belt;

a control unit;

at least one camera, which is configured to capture an image of the covering blank located on the belt and which is connected to the control unit, wherein the control unit is configured to compare the image captured by the camera with a reference model previously stored and to instruct the placing element to modify the placing position of the placing element as a function of the comparison between the image captured by the camera and the reference image, wherein the placing element includes a pushing element, operating on the inside surface of the base wall of the box and movable along the vertical direction, wherein the positioning device further comprises one or more strips, operating on the outside surface of the base wall of the box and movable from a closed configuration, where they are oriented horizontally to support the box, to an open configuration, where they are oriented vertically to enable the pushing element to move the box downwards to the placing position on the covering blank, wherein the positioning device further comprises one or more actuators, configured to move the one or more strips from the closed configuration to the open configuration and vice versa.

19. The production line according to claim 18, wherein the column of the plurality of columns are movable in a horizontal plane perpendicular to the vertical direction, towards and away from each other between at least a first configuration for forming boxes of a first size, and a second configuration for forming boxes of a second size, different from the first size.

20. The production line according to claim 18, wherein the plate of the covering machine includes, on an underside face of it, a suction pad configured to hold an inside face of the base wall of the box.

\* \* \* \* \*